United States Patent
Tamanoi et al.

(10) Patent No.: US 6,356,516 B2
(45) Date of Patent: Mar. 12, 2002

(54) MAGNETO-OPTICAL RECORDING MEDIUM AND REPRODUCING METHOD FOR INFORMATION RECORDED ON THE MEDIUM

(75) Inventors: Ken Tamanoi; Keiji Shono; Sumio Kuroda; Motonobu Mihara; Koji Matsumoto, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/732,092

(22) Filed: Dec. 7, 2000

Related U.S. Application Data

(62) Division of application No. 08/368,607, filed on Jan. 4, 1995, now abandoned.

(30) Foreign Application Priority Data

| Jan. 14, 1994 | (JP) | 6-002449 |
| Mar. 1, 1994 | (JP) | 6-031661 |
| Sep. 5, 1994 | (JP) | 6-211102 |

(51) Int. Cl.[7] .................. G11B 11/00; G11B 11/105
(52) U.S. Cl. ............... 369/13; 428/332; 428/336; 428/694 ML; 428/694 MM; 428/694 EC; 428/668
(58) Field of Search .................. 428/611, 655, 428/694 RE, 694 MM, 694 EC, 900, 332, 336, 694 ML, 668; 369/13

(56) References Cited

U.S. PATENT DOCUMENTS

| 4,871,614 A | 10/1989 | Kobayashi ............ 369/13 |
| 5,168,482 A | 12/1992 | Aratani et al. ........ 369/13 |
| 5,208,799 A | 5/1993 | Nakao et al. ......... 369/110 |
| 5,265,074 A | 11/1993 | Ohta et al. ............ 369/13 |
| 5,278,810 A | 1/1994 | Takahashi et al. .... 369/13 |
| 5,317,555 A | 5/1994 | Takahashi et al. .... 369/110 |
| 5,379,275 A | 1/1995 | Kaneko et al. ....... 369/13 |

(List continued on next page.)

FOREIGN PATENT DOCUMENTS

| EP | 492553 A2 | 7/1992 |
| EP | 586122 A1 | 3/1994 |
| EP | 586175 A1 | 3/1994 |
| EP | 596716 A2 | 5/1994 |
| JP | 63239637 | 10/1988 |
| JP | 63316343 | 12/1988 |
| JP | 3152742 | 6/1991 |

(List continued on next page.)

OTHER PUBLICATIONS

Kaneko, M., Aratani, K., Ohta, M., Proc. Int. Symp. Optical Mem., 1991, 203–210.*

Primary Examiner—Stevan A. Resan
Assistant Examiner—Kevin M. Bernatz
(74) Attorney, Agent, or Firm—Greer, Burns & Crain, Ltd.

(57) ABSTRACT

A magneto-optical recording medium capable of perfectly masking a mark adjacent to a mark to be reproduced thereby improvng reproduction output. The magneto-optical recording medium includes a transparent substrate, a magnetic reproducing layer laminated on the transparent substrate, a nonmagnetic intermediate layer laminated on the magnetic reproducing layer, and a magnetic recording layer laminated on the nonmagnetic intermediate layer. The reproducing layer has an easy direction of magnetization in a plane at room temperature, and has an easy direction of magnetization perpendicular to a film surface at a given temperature or higher. The nonmagnetic intermediate layer is thin enough to allow magnetostatic bond between the recording layer and the reproducing layer at the given temperature or higher. Instead of the nonmagnetic intermediate layer, a magnetic intermediate layer having an easy direction of magnetization in a plane from room temperature to its Curie temperature may be interposed between the reproducing layer and the recording layer.

9 Claims, 17 Drawing Sheets

U.S. PATENT DOCUMENTS

| | | |
|---|---|---|
| 5,420,833 A | 5/1995 | Tanaka et al. ................. 399/13 |
| 5,428,585 A | 6/1995 | Hirokane et al. .............. 369/13 |
| 5,450,382 A | 9/1995 | Shiratori ...................... 369/13 |
| 5,452,272 A | 9/1995 | Murakami et al. ............. 359/13 |
| 5,563,852 A | 10/1996 | Murakami et al. .......... 428/694 |
| 5,615,428 A | 4/1997 | Nishimura et al. .......... 428/694 |
| 5,616,428 A * | 4/1997 | Nishimura et al. .. 428/694 ML |
| 5,705,286 A | 1/1998 | Hirokane et al. ........... 428/694 |
| 5,783,300 A * | 7/1998 | Osato et al. ................. 428/332 |
| 5,821,004 A | 10/1998 | Hino et al. ................. 428/694 |
| 6,248,439 B1 * | 6/2001 | Tamanoi et al. ............ 428/332 |

FOREIGN PATENT DOCUMENTS

| | | |
|---|---|---|
| JP | 4255941 | 9/1992 |
| JP | 512732 | 1/1993 |
| JP | 581717 | 4/1993 |
| JP | 5342670 | 12/1993 |
| JP | 6119669 | 4/1994 |
| JP | 6150418 | 5/1994 |

* cited by examiner

FIG. 31A
FIG. 31B
FIG. 31C PRIOR ART
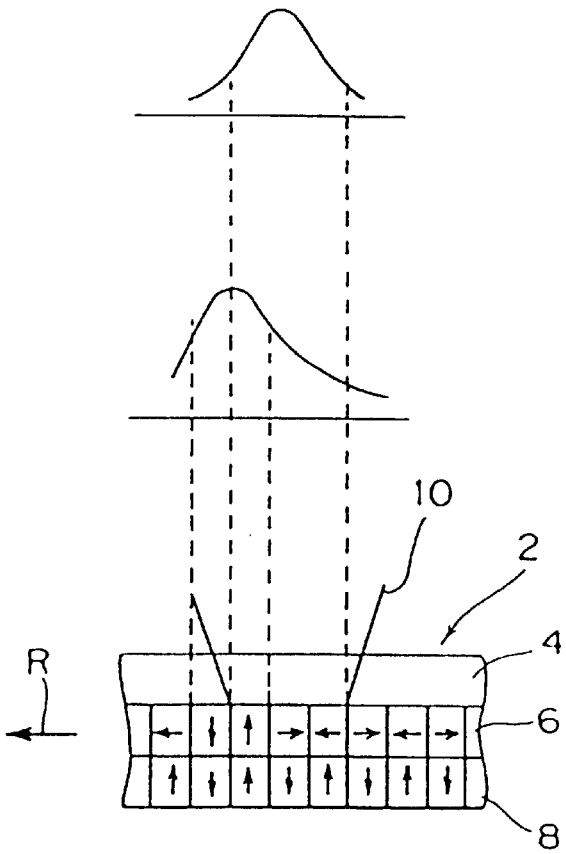
FIG. 32 PRIOR ART
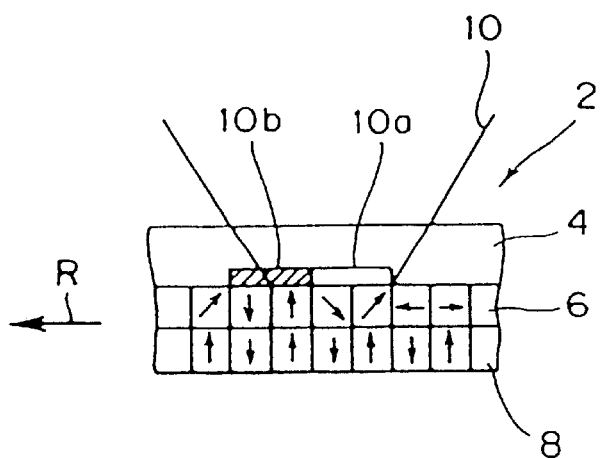

MAGNETO-OPTICAL RECORDING MEDIUM AND REPRODUCING METHOD FOR INFORMATION RECORDED ON THE MEDIUM

This is a divisional, of application Ser. No. 08/368,607, filed Jan. 4, 1995 now abandoned.

BACKGROUND OF THE INVENTION

1. Field of the Invention

The present invention relates to a high-density magneto-optical recording medium and a reproducing method for information recorded on the medium.

2. Description of the Related Art

A magneto-optical disk is known as a high-density recording medium, and an increase in information quantity gives rise to a desire for higher densities of the medium. While the higher densities may be realized by reducing the space of recorded marks, the recording and reproducing of the marks are limited by the size of a light beam (beam spot) on the medium. When the presence of only one recorded mark in the beam spot is set, an output waveform corresponding to "1" or "0" may be observed as a reproduction signal according to whether the recorded mark is present or absent in the beam spot.

However, when the presence of plural recorded marks in the beam spot is set by reducing the space of the recorded marks, no change in reproduction output occurs regardless of movement of the beam spot on the medium. Accordingly, the output waveform becomes linear and the presence or absence of the recorded mark in the beam spot cannot be identified. To reproduce such small recorded marks having a period smaller than the size of the beam spot, it is sufficient to reduce the beam spot to a small size. However, since the size of the beam spot is limited by the wavelength $\lambda$ of a light source and the numerical aperture NA of an objective lens, the beam spot cannot be sufficiently reduced to a small size.

There has recently been proposed a reproducing method using magnetically induced super resolution such that a recorded mark smaller in size than the beam spot can be reproduced by the use of an existing optical system. According to this method, the resolution of reproduction is improved by masking other marks during reproduction of one mark in the beam spot. Accordingly, a super resolution disk medium is required to have at least a mask layer or a reproducing layer for masking other marks so that only one mark may be reproduced during signal reproduction, in addition to a recording layer for recording marks. A magneto-optical recording medium using a perpendicular magnetization film as the reproducing layer is proposed in Japanese Patent Laid-open No. 3-88156. In the prior art described in this publication, however, an initializing magnetic field of about several kOe is required to initialize the reproducing layer. Accordingly, a recording apparatus cannot be made compact.

On the other hand, a magneto-optical recording medium using a magnetic film as the recording layer is proposed in Japanese Patent Laid-open Nos. 5-81717 and 5-342670. This magnetic film has an easy direction of magnetization in a plane at room temperature and has an easy direction of magnetization perpendicular to a film surface at a given temperature or higher. The principle of reproduction in this prior art will now be described in brief with reference to FIGS. 31A, 31B, and 31C. As shown in FIG. 31C, a magneto-optical disk 2 is formed by laminating a magnetic reproducing layer 6 and a magnetic recording layer 8 on a transparent substrate 4. The magnetic reproducing layer 6 has an easy direction of magnetization in a plane at room temperature. However, when the medium is heated to a given temperature or higher by applying a reproducing power, the easy direction of magnetization is changed to a perpendicular direction. The magnetic recording layer 8 is a perpendicular magnetization film. Reference numeral 10 denotes a light beam.

The intensity distribution of the light beam is a Gaussian distribution as shown in FIG. 31A. Accordingly, when the disk is at rest, the temperature distribution on the disk is also a similar distribution such that the central portion is higher in temperature than the peripheral portion. In operation, however, the disk 2 is rotated in the direction of arrow R shown in FIG. 31C during reproduction. Accordingly, the temperature distribution on the disk in rotation becomes a distribution as shown in FIG. 31B so that a high-temperature area in the beam spot is shifted to the forward direction of rotation of the disk. Owing to such a temperature distribution during reproduction, the easy direction of magnetization of the magnetic reproducing layer 6 becomes an in-plane direction in a low-temperature area in the beam spot. Therefore, the Kerr rotation angle of reflected light becomes almost zero in the low-temperature area. In the high-temperature area, the easy direction of magnetization of the magnetic reproducing layer 6 is changed from an in-plane direction to an perpendicular direction.

The perpendicular magnetization of the magnetic reproducing layer 6 at this time is bonded to the magnetization of the magnetic recording layer 8 by an exchange force, and the direction of magnetization of the reproducing layer 6 is made identical with the direction of magnetization of the recording layer 8, thereby allowing the magnetization recorded in the recording layer 8 to be transferred to the reproducing layer 6. The area size of such transfer can be changed by varying a reproducing laser beam power. In this manner, the size of the masking reproducing layer is controlled so as to allow the reproduction of only one recorded mark, thereby obtaining the same effect as that in the case of substantially reducing the area of the beam spot.

As mentioned above, the intensity distribution of the laser beam 10 directed onto the disk 2 is a Gaussian distribution, and the disk 2 is rotated in the direction of arrow R. As a result, a low-temperature area 10a and a high-temperature area 10b are formed on the reproducing layer 6 (see FIG. 32). The high-temperature area 10b is shifted to the forward direction of rotation of the disk 2 with respect to the laser beam 10. In the prior art disclosed in Japanese Patent Laid-open No. 5-81717, however, the in-plane magnetization of the reproducing layer 6 in the low-temperature area 10a in the beam spot is bonded to the perpendicular magnetization of the recording layer 8, causing inclination of the in-plane magnetization to generate a perpendicular component as shown in FIG. 32.

As a result, the masking effect is reduced and a mark recorded on the recording layer adjacent to a mark to be reproduced cannot be perfectly masked. Accordingly, the magnetization of the recording layer in the low-temperature area is also transferred to the reproducing layer, so that individual marks cannot be identified because of interference causing a reduction in reproduction output.

Japanese Patent Laid-open No. 5-342670 mentioned above discloses a magneto-optical recording medium having a magnetic intermediate layer interposed between a magnetic reproducing layer and a magnetic recording layer. The magnetic intermediate layer is provided to prevent the possibility that when the exchange bonding force between the recording layer and the reproducing layer is too strong, the magnetization direction of the reproducing layer becomes perpendicular in an area where the laser beam is not directed, thereby reducing the masking effect of the reproducing layer. The magnetic intermediate layer described in this publication is considered from its composition to have a Curie point lower than a temperature of the medium to be heated by the reproducing laser beam. While the operation of the magnetic intermediate layer is not described in detail in this publication, it may be considered as follows:

When the magnetic intermediate layer is heated to temperatures higher than its Curie temperature, the magnetization of the intermediate layer disappears. At this time, in the low-temperature area in the beam spot, a stable in-plane mask is formed in the reproducing layer, while in the high-temperature area, the magnetization of the recording layer is transferred to the reproducing layer by a magnetostatic bond. Accordingly, information recorded on the medium in the high-temperature area can be read out. However, the transfer of the magnetization by a magnetostatic bonding force is weaker than the transfer of the magnetization by an exchange bonding force. Thus, the medium having the magnetic intermediate layer described in this publication is not satisfactory in transfer characteristic of the magnetization in the high-temperature area in the beam spot. In addition, the magnetostatic bonding force between the recording layer and the reproducing layer is absorbed by the magnetic intermediate layer, thus further hindering the transfer characteristic of the magnetization.

SUMMARY OF THE INVENTION

It is therefore an object of the present invention to provide a magneto-optical recording medium which can perfectly mask a mark adjacent to a mark to be reproduced to thereby improve a reproduction output.

It is another object of the present invention to provide a magneto-optical recording medium which can prevent the crosstalk between a track to be reproduced and a track adjacent to this track to thereby realize the improvement in the reproduction output.

According to a first aspect of the present invention, there is provided a magneto-optical recording medium comprising a transparent substrate; a magnetic reproducing layer laminated on said transparent substrate, said reproducing layer having an easy direction of magnetization in a plane at room temperature and having an easy direction of magnetization perpendicular to a film surface at a given temperature or higher; a nonmagnetic intermediate layer laminated on said reproducing layer; and a magnetic recording layer laminated on said nonmagnetic intermediate layer, said recording layer having an easy direction of magnetization perpendicular to a film surface; wherein said nonmagnetic intermediate layer is thin enough to allow magnetostatic bond between said recording layer and said reproducing layer.

Preferably, the nonmagnetic intermediate layer has a thickness ranging from 1 nm to 10 nm. The nonmagnetic intermediate layer is formed from a substance selected from the group consisting of Al, Si, Ti, oxides, and nitrides thereof.

According to the first aspect, the nonmagnetic intermediate layer is interposed between the magnetic recording layer and the magnetic reproducing layer, so that the exchange bonding force between the two magnetic layers can be perfectly cut off. Owing to the sufficiently small thickness of the nonmagnetic intermediate layer, when the reproducing power is applied to the medium to heat the reproducing layer to the given temperature or higher, the magnetization of the recording layer is transferred to the reproducing layer by the magnetostatic interaction, thereby reproducing the information recorded on the recording layer. The exchange interaction between the recording layer and the reproducing layer is cut off by the nonmagnetic intermediate layer, thereby preventing the inclination of magnetization of the reproducing layer from the in-plane direction due to the exchange interaction in a low-temperature area in a beam spot, with the result that the reproduction output can be improved.

According to a second aspect of the present invention, there is provided a magneto-optical recording medium comprising a transparent substrate; a magnetic reproducing layer laminated on said transparent substrate, said reproducing layer having an easy direction of magnetization in a plane at room temperature and having an easy direction of magnetization perpendicular to a film surface at a given temperature or higher; a magnetic intermediate layer laminated on said reproducing layer, said magnetic intermediate layer having an easy direction of magnetization in a plane; and a magnetic recording layer laminated on said magnetic intermediate layer, said recording layer having an easy direction of magnetization perpendicular to a film surface.

Preferably, the magnetic intermediate layer is formed from a light rare earth-transition metal amorphous alloy film represented by $R_X Fe_X Co_{1-X-Y}$ (R=Nd, Sm), where $0<X<0.5$ and $0 \leq Y<0.5$.

According to the second aspect, the magnetic intermediate layer having an easy direction of magnetization always in a plane is interposed between the magnetic recording layer and the magnetic reproducing layer. Accordingly, the in-plane magnetization of the magnetic intermediate layer is stable in a low-temperature area in a beam spot in applying a reproducing power to the medium, so that there does not occur the inclination of magnetization of the magnetic intermediate layer due to the perpendicular magnetization of the recording layer. In a high-temperature area in the beam spot, the easy direction of magnetization of the reproducing layer is perpendicular. At this time, the perpendicular direction of magnetization of the magnetic intermediate layer becomes an easy direction of magnetization because of the perpendicular magnetization of both the recording layer and the reproducing layer, and is made identical with the direction of magnetization of the recording layer by the exchange bond to the magnetization of the recording layer. Furthermore, the magnetization of the reproducing layer is exchange-bonded to the magnetization of the magnetic intermediate layer, and the direction of magnetization of the reproducing layer therefore becomes identical with the direction of magnetization of the intermediate layer. As a result, the direction of magnetization of the recording layer is transferred to the reproducing layer.

According to a third aspect of the present invention, there is provided a magneto-optical recording medium comprising a transparent substrate; a magnetic opening portion control layer laminated on said transparent substrate, said control layer having an easy direction of magnetization in a plane and having a transmittance of 60% or more; a magnetic reproducing layer laminated on said control layer, said reproducing layer having an easy direction of magnetization in a plane at room temperature and having an easy direction of magnetization perpendicular to a film surface at a given temperature or higher; and a magnetic recording layer laminated on said reproducing layer, said recording layer having an easy direction of magnetization perpendicular to a film surface.

Preferably, a Curie temperature Tc1 of said control layer, a Curie temperature Tc2 of said reproducing layer, a Curie temperature Tc3 of said recording layer, a room temperature Troom, and a temperature Tread of said reproducing layer in applying a reproducing power thereto are related to satisfy Tc2>Tc3>Tc1>Troom, and Tread>Tc1 at an opening portion of said control layer.

According to the third aspect, the control layer having a transmittance of 60% or more is provided. As the low-temperature area in the reproducing beam spot is subjected to temperatures lower than the Curie temperature of the control layer, the in-plane magnetization remains in the control layer. As a result, the magnetization of the reproducing layer follows the magnetization of the control layer owing to the exchange bonding force to become the in-plane magnetization. Accordingly, the control layer serves as a mask in the low-temperature area, thereby making impossible the reproduction of a mark in the reproducing layer. In the high-temperature area in the reproducing beam spot, the control layer is heated to temperatures higher than the Curie temperature, causing disappearance of the magnetization of the control layer. As a result, the bond in magnetization between the reproducing layer and the control layer is cut to bring the magnetization of the reproducing layer into perfectly perpendicular magnetization, thereby allowing the reproduction of the mark in the reproducing layer through the control layer.

According to a fourth aspect of the present invention, there is provided a magneto-optical recording medium comprising a transparent substrate; a magnetic reproduction assisting layer laminated on said transparent substrate, said assisting layer having an easy direction of magnetization perpendicular to a film surface; a magnetic reproducing layer laminated on said assisting layer, said reproducing layer having an easy direction of magnetization in a plane at room temperature; and a magnetic recording layer laminated on said reproducing layer, said recording layer having an easy direction of magnetization perpendicular to a film surface; wherein a Curie temperature Tc1 of said assisting layer, a Curie temperature Tc2 of said reproducing layer, and a Curie temperature Tc3 of said recording layer are related to satisfy Tc3<Tc1 and Tc3<Tc2; and a coercive force Hc1 of said assisting layer and a coercive force Hc3 of said recording layer are related to satisfy Hc3>Hc1.

According to the fourth aspect, the direction of magnetization of the reproducing layer is an in-plane direction in the low-temperature area in the beam spot. Accordingly, the direction of magnetization of the assisting layer is made identical with the direction of a bias magnetic field to form a perpendicular mask. In the high-temperature area in the beam spot, the magnetization of the reproducing layer is exchange-bonded to the magnetization of the recording layer, and the magnetization of the reproducing layer is also exchange-boned to the magnetization of the assisting layer. Accordingly, the direction of magnetization of the recording layer is transferred to the assisting layer, thereby allowing reading of information recorded in the recording layer.

Accordingly, when a magneto-optical output is differentially detected, the low-temperature area in the beam spot acts as a mask, so that a magneto-optical signal in the low-temperature area is not read out, but a magneto-optical signal only in the high-temperature area is read out. Therefore, a mark having a size less than the diffraction limit of a reproducing laser wavelength can be read out.

According to another aspect of the present invention, there is provided a reproducing method for information recorded on a magneto-optical recording medium comprising a transparent substrate; a magnetic reproducing layer laminated on said transparent substrate, said reproducing layer having an easy direction of magnetization in a plane at room temperature and having an easy direction of magnetization perpendicular to a film surface at a given temperature or higher; a nonmagnetic intermediate layer laminated on said reproducing layer; and a magnetic recording layer laminated on said nonmagnetic intermediate layer, said recording layer having an easy direction of magnetization perpendicular to a film surface; wherein said nonmagnetic intermediate layer is thin enough to allow magnetostatic bond between said recording layer and said reproducing layer; said reproducing method comprising the steps of directing a laser beam onto said recording medium as applying a bias magnetic field to heat said recording medium to temperatures lower than the Curie temperature of said recording layer; and forming a temperature distribution in a beam spot, said temperature distribution comprising a low-temperature area where the direction of magnetization of said reproducing layer is an in-plane direction, an intermediate-temperature area where $Hr \leq Hs+Hc$ is satisfied and magnetization of said recording layer is transferred to said reproducing layer by magnetostatic bond, and a high-temperature area where $Hr>Hs+Hc$ is satisfied and the direction of magnetization of said reproducing layer is identical with the direction of said bias magnetic field; where Hr represents a strength of said bias magnetic field, Hs represents a magnetostatic bonding force between said reproducing layer and said recording layer, and Hc represents a coercive force of said reproducing layer.

Preferably, the reproducing layer and the recording layer are formed from a rare earth-transition metal amorphous alloy film. When the recording layer is formed from a rare earth rich rare earth-transition metal amorphous alloy film, there is formed in the beam spot a temperature distribution comprising a low-temperature area where the direction of magnetization of the reproducing layer is made identical with the direction of the bias magnetic field, an intermediate-temperature area where the magnetization of the recording layer is transferred to the reproducing layer, and a high-temperature area where the direction of magnetization of the reproducing layer is made identical with the direction of the bias magnetic field.

According to still another aspect of the present invention, there is provided a reproducing method for information recorded on a magneto-optical recording medium comprising a transparent substrate; a magnetic reproducing layer laminated on said transparent substrate, said reproducing layer having an easy direction of magnetization in a plane at room temperature and having an easy direction of magnetization perpendicular to a film surface at a given temperature or higher; a nonmagnetic intermediate layer laminated on said reproducing layer; and a magnetic recording layer laminated on said nonmagnetic intermediate layer, said recording layer having an easy direction of magnetization perpendicular to a film surface; wherein said nonmagnetic intermediate layer is thin enough to allow magnetostatic bond between said recording layer and said reproducing layer; said reproducing method comprising the steps of directing a laser beam onto said recording medium to heat said recording medium to temperatures lower than the Curie temperature of said recording layer; and forming a temperature distribution in a beam spot, said temperature distribution comprising a low-temperature area where the direction of magnetization of said reproducing layer is an in-plane direction, an intermediate-temperature area where magnetization of said recording layer is transferred to said reproducing layer by magnetostatic bond, and a high-temperature area where said magnetization transferred to said reproducing layer is spontaneously extinguished by high temperatures to make the direction of magnetization of said reproducing layer identical with the direction of magnetization to be erased.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 31A, 31B, and 31C are views illustrating the principle of reproduction in the prior art; and FIG. 32 is a view illustrating the problem in the prior art.

DETAILED DESCRIPTION OF THE PREFERRED EMBODIMENTS

Figure 1:
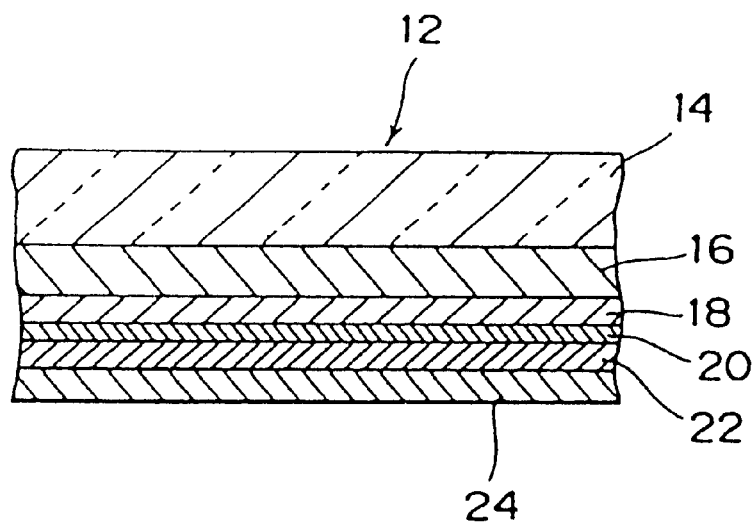
FIG. 1 is a sectional view of a magneto-optical recording medium according to a first preferred embodiment of the present invention.

The structure of a magneto-optical recording medium 12 according to a first preferred embodiment of the present invention will be described with reference to FIG. 1. The magneto-optical recording medium 12 is usually in the form of disk. A dielectric layer 16 formed of SiN or the like by sputtering, for example, is laminated on a transparent substrate 14 formed of glass or the like. The dielectric layer 16 prevents oxidation and corrosion of a magnetic layer laminated thereon. Resins such as polycarbonate, polymethyl methacrylate, and amorphous olefin may be adopted as the transparent substrate 14. Metal nitrides such as AlN, metal oxides such as $SiO_2$ and $Al_2O_3$, and metal sulfides such as ZnS may be adopted as the dielectric layer 16.

A magnetic reproducing layer 18 formed from a rare earth-transition metal amorphous alloy film such as GdFeCo is laminated on the dielectric layer 16. The magnetic reproducing layer 18 has an easy direction of magnetization in a plane at room temperature, and has an easy direction of magnetization perpendicular to its film surface at temperatures higher than a given temperature to which the layer 18 is heated by a reproducing beam power. A nonmagnetic intermediate layer 20 formed of SiN or the like is laminated on the magnetic reproducing layer 18. Metal nitrides such as AlN, metal oxides such as $SiO_2$ and $Al_2O_3$, and metal sulfides such as ZnS may be adopted as the nonmagnetic intermediate layer 20.

A magnetic recording layer 22 formed from a rare earth-transition metal amorphous alloy film such as TbFeCo is laminated on the nonmagnetic intermediate layer 20. The magnetic recording layer 22 has an easy direction of magnetization perpendicular to its film surface. As the nonmagnetic intermediate layer 20 is interposed between the magnetic reproducing layer 18 and the magnetic recording layer 22, the exchange bond between the magnetic reproducing layer 18 and the magnetic recording layer 22 is perfectly cut off. The nonmagnetic intermediate layer 20 must be thin enough to permit the magnetostatic bond between the magnetic recording layer 22 and the magnetic reproducing layer 18 when the magnetic reproducing layer 18 is heated to the given temperature. Specifically, the thickness of the nonmagnetic intermediate layer 20 is preferably in the range of 1 nm to 10 nm, which will be hereinafter described in detail.

There exists an optimum thickness of the dielectric layer 16. This may be obtained as follows:

When the reflectivity R of the medium is minimum, the Kerr rotation angle becomes maximum, and the Kerr enhancement is amplified. The interference conditions are given by the following equation.

$$2nd = \lambda(2m+1)/2$$

where n is the refractive index; $\lambda$ is the laser wavelength; d is the thickness of the dielectric layer; and m is the order. Substituting n=2.15, $\lambda$=780 nm, and m=0 for the above equation, d=780/(4×2.15)=90.7≈90 is obtained.

Accordingly, the optimum thickness of the dielectric layer 16 is 90 nm.

A protective film 24 is laminated on the magnetic recording layer 22 to complete the magneto-optical recording medium 12. The protective film 24 prevents entry of water, oxygen, or other substances such as halogen, from the air to protect the magnetic recording layer 22. Metal nitrides such as SiN and AlN, metal oxides such as $SiO_2$ and $Al_2O_3$, and metal sulfides such as ZnS may be adopted as the protective film 24.

Figure 2:
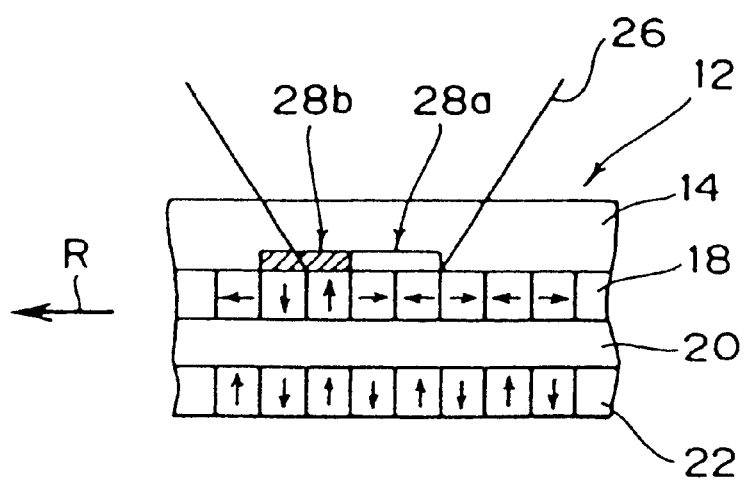
FIG. 2 is a view illustrating a reproducing method for the recording medium according to the first preferred embodiment.

A reproducing method for information recorded on the magneto-optical recording medium 12 according to the first preferred embodiment will be described with reference to FIG. 2. The directions of magnetization of the magnetic reproducing layer and the magnetic recording layer are shown by arrows, and the recording medium 12 is rotated in the direction of arrow R. Let Ts denotes a temperature at which the direction of magnetization of the magnetic reproducing layer 18 changes from an in-plane direction to a perpendicular direction. In a low-temperature area 28a where the temperature T of the medium irradiated with a reproducing beam 26 is lower than the temperature Ts, the exchange bond between the magnetic reproducing layer 18 and the magnetic recording layer 22 is perfectly cut off because the nonmagnetic intermediate layer 20 is interposed between the two magnetic layers 18 and 22. Accordingly, the magnetic reproducing layer 18 perfectly shows in-plane magnetization without being affected by the perpendicular magnetization of the magnetic recording layer 22.

In a high-temperature area 28b where the temperature T of the medium is higher than the temperature Ts, the magnetic reproducing layer 18 shows perpendicular magnetization. The direction of magnetization of the magnetic reproducing layer 18 in the high-temperature area 28b is made identical with the direction of magnetization of the magnetic recording layer 22 because the layer 18 is magnetostatically bonded to the layer 22 by the floating magnetic field from the perpendicular magnetization of the layer 22. Accordingly, the magnetization of the magnetic recording layer 22 is transferred to the magnetic reproducing layer 18, and a reproduction output can be improved by reading only the high-temperature area 28b. As shown, a part of the high-temperature area 28b where the magnetization of the magnetic reproducing layer becomes perpendicular magnetization is present outside the beam spot; however, the magnetization area outside the beam spot is not reproduced, so that only the perpendicular magnetization part of the high-temperature area 28b inside the beam spot can be read.

In this preferred embodiment, the magnetic reproducing layer 18 in the low-temperature area shows stable in-plane magnetization, which therefore acts as a perfect mask to thereby obtain a high reproduction output without interference with adjacent marks during reproduction. As mentioned above, the nonmagnetic intermediate layer 20 is formed of metals such as Al, Si, and Ti, their oxides or nitrides. The nonmagnetic intermediate layer 20 must be thin enough to permit the magnetostatic bond between the magnetic recording layer 22 and the magnetic reproducing layer 18 at temperatures higher than the given temperature. The preferable range of the thickness of the nonmagnetic intermediate layer 20 will now be described.

Figure 3:
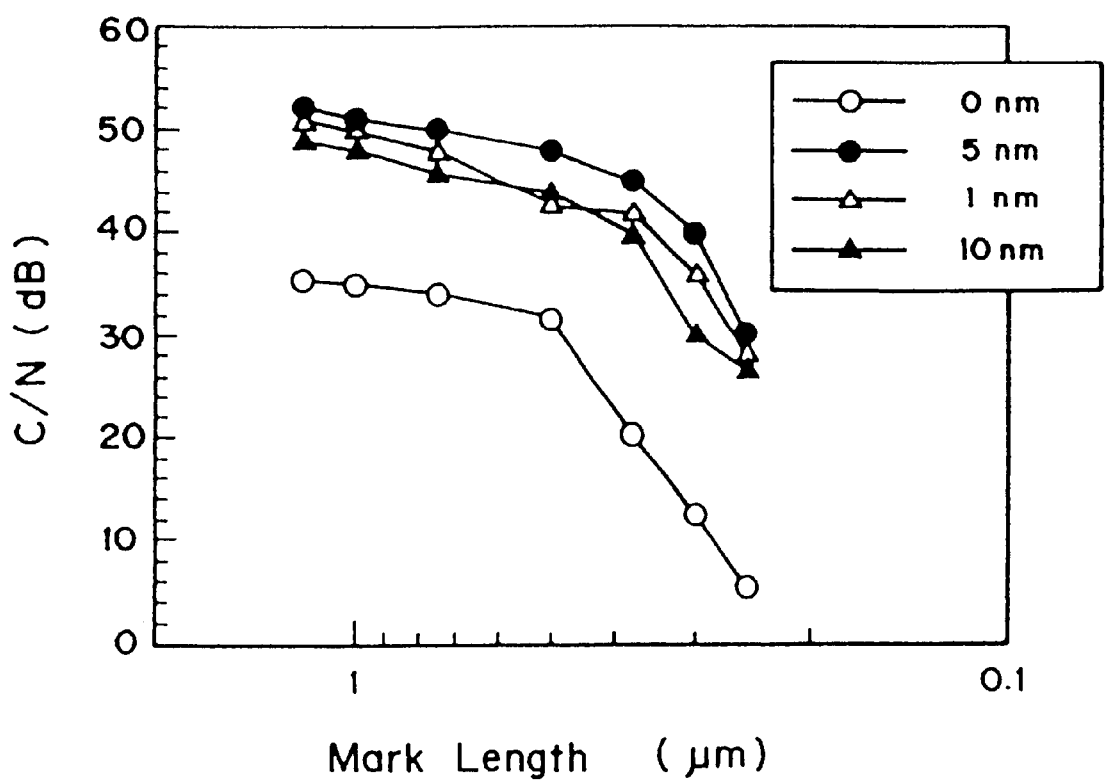
FIG. 3 is a graph showing the mark length dependency of C/N with the thickness of a nonmagnetic intermediate layer changed.

Referring to FIG. 3, there is shown a mark length dependency of a carrier-to-noise ratio, i.e., C/N in the case of changing the thickness of the nonmagnetic intermediate layer 20. As apparent from this graph, when the thickness of the nonmagnetic intermediate layer 20 is in the range of 1 nm to 10 nm, the C/N is remarkably improved. If the thickness of the nonmagnetic intermediate layer 20 is larger than 10 nm, e.g., it is 15 nm, a sufficient magnetostatic bond between the magnetic reproducing layer 18 and the magnetic recording layer 22 cannot be obtained. Accordingly, the thickness of the layer 20 larger than 10 nm is not preferable. Further, if the thickness of the layer 20 is smaller than 1 nm, the exchange bond between the reproducing layer 18 and the recording layer 22 cannot be cut off. Accordingly, the thickness of the layer 20 smaller than 1 nm is not preferable. Thus, the preferable thickness of the nonmagnetic intermediate layer 20 ranges from 1 nm to 10 nm.

Figure 4:
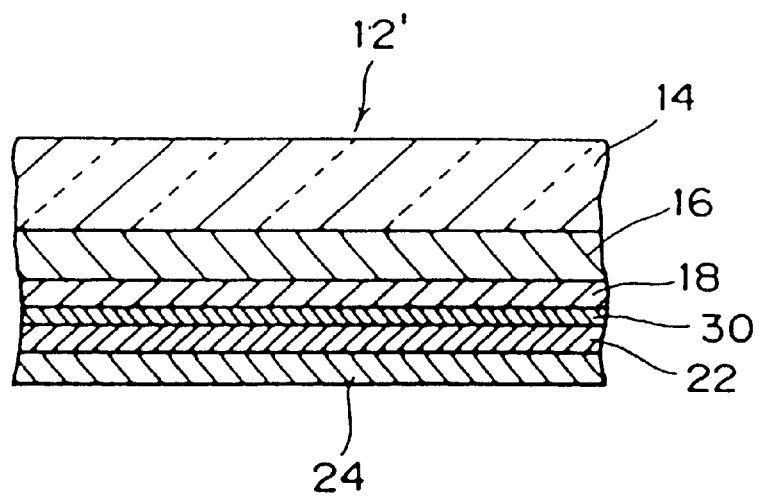
FIG. 4 is a sectional view of a magneto-optical recording medium according to a second preferred embodiment of the present invention.

The structure of a magneto-optical recording medium 12' according to a second preferred embodiment of the present invention will be described with reference to FIG. 4. In the following description of this preferred embodiment, the same parts as those in the first preferred embodiment shown in FIG. 1 are denoted by the same reference numerals, and the explanation thereof will be omitted to avoid repetition. This preferred embodiment is different from the first preferred embodiment in the point that a magnetic intermediate layer 30 is interposed between the magnetic reproducing layer 18 and the magnetic recording layer 22. The other layers are similar in structure to those in the first preferred embodiment.

The magnetic intermediate layer 30 is a magnetic layer having an easy direction of magnetization in a plane, and has a large saturation magnetization Ms. Therefore, the in-plane magnetization direction is stable over the range of room temperature to its Curie temperature. The magnetic intermediate layer 30 is formed from a light rare earth-transition metal amorphous alloy film represented by $R_X Fe_Y Co_{1-X-Y}$ (R=Nd, Sm) where $0 < X < 0.5$ and $0 \leq Y < 0.5$.

Figure 5:
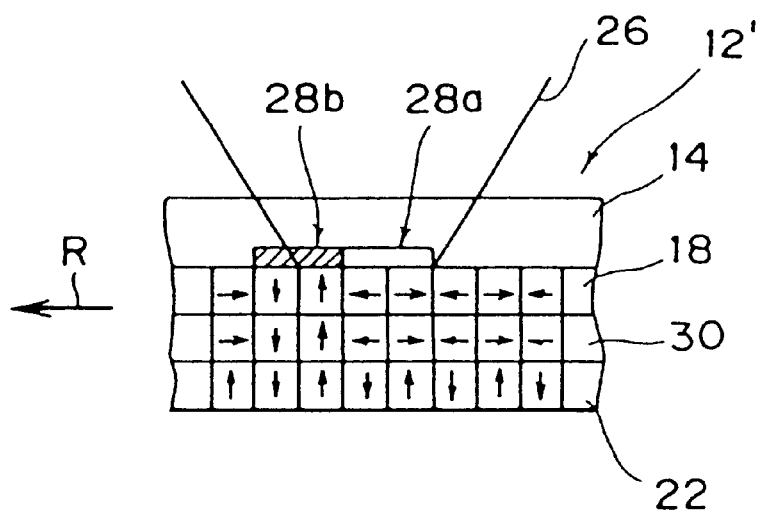
FIG. 5 is a view illustrating a reproducing method for the recording medium according to the second preferred embodiment.

A reproducing method for information recorded on the magneto-optical recording medium 12' according to the second preferred embodiment will be described with reference to FIG. 5. The magneto-optical recording medium 12' is rotated in the direction of arrow R. In the low-temperature area 28a in the laser spot formed on the medium irradiated with the reproducing laser beam 26, the temperature T of the medium is lower than the temperature Ts. Accordingly, the magnetic reproducing layer 18 shows in-plane magnetization. In the low-temperature area 28a, the saturation magnetization Ms of the magnetic intermediate layer 30 is large, and the in-plane magnetization direction of the layer 30 is therefore stable. Accordingly, there does not occur the inclination of magnetization of the layer 30 due to the perpendicular magnetization of the magnetic recording layer 22. As a result, the in-plane magnetization direction of the magnetic reproducing layer 18 is also stable in the low-temperature area 28a.

In the high-temperature area 28b where the temperature T of the medium is higher than the temperature Ts, the easy direction of magnetization of the magnetic reproducing layer 18 is perpendicular. Accordingly, the easy direction of magnetization of the magnetic intermediate layer 30 becomes perpendicular because of the perpendicular magnetization of the recording layer 22 and the reproducing layer 18, and the direction of magnetization of the layer 30 is made identical with that of the layer 22 by the exchange bond between the two layers 30 and 22. Further, the direction of magnetization of the reproducing layer 18 is also made identical with that of the intermediate layer 30 by the exchange bond between the two layers 18 and 30. As a result, the magnetization of the recording layer 22 is transferred to the reproducing layer 18, and the magnetization thus transferred to the reproducing layer 18 can be read by directing the reproducing laser beam 26 to the medium. Further, when the thickness of the reproducing layer 18 is small enough to permit the laser beam to reach the intermediate layer 30, a large Kerr rotation angle is obtained in reproduced light because the Kerr rotation angle of the intermediate layer 30 formed from a light rare earth (e.g., Nd)-transition metal amorphous alloy film is larger than the Kerr rotation angle of the reproducing layer 18, thereby obtaining a high reproduction output.

The magnetic intermediate layer 30 in this preferred embodiment is different from the magnetic intermediate layer mentioned in Japanese Patent Laid-open No. 5-342670 in the following point. In the intermediate layer mentioned in this publication, the magnetization of the intermediate layer disappears at a temperature of heating by the reproducing laser beam. To the contrary, the magnetization of the intermediate layer 30 in this preferred embodiment does not disappear at a temperature of heating by the reproducing laser beam because of a sufficiently high Curie temperature. Accordingly, the magnetization of the recording layer 22 is transferred to the intermediate layer 30 by the exchange bond therebetween, and the magnetization of the intermediate layer 30 is transferred to the reproducing layer 18 by the exchange bond therebetween. Thus, the magnetization transfer characteristic in this preferred embodiment is greatly improved.

Figure 6:
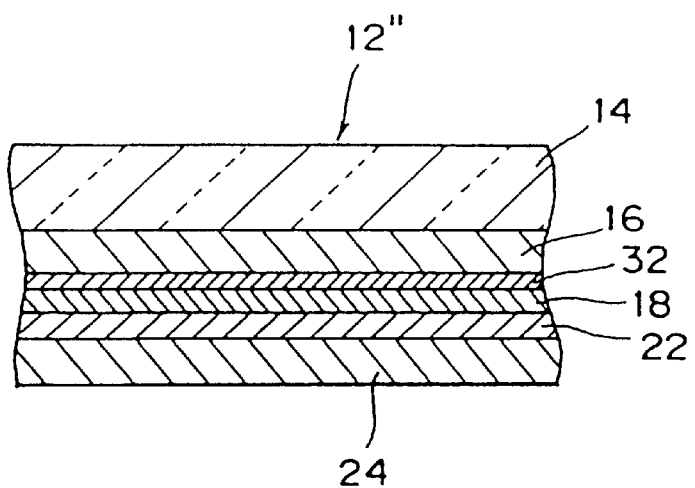
FIG. 6 is a sectional view of a magneto-optical recording medium according to a third preferred embodiment of the present invention.

The structure of a magneto-optical recording medium 12" according to a third preferred embodiment of the present invention will be described with reference to FIG. 6. In the following description of this preferred embodiment, the same parts as those in the first preferred embodiment shown in FIG. 1 are denoted by the same reference numerals, and the explanation thereof will be omitted to avoid repetition. In this preferred embodiment, a magnetic opening portion control layer 32 is laminated on the dielectric layer 16 by DC magnetron sputtering, for example. The magnetic reproducing layer 18 is laminated on the control layer 32. The control layer 32 always has an easy direction of magnetization in a plane over the range of room temperature to its Curie temperature. The optical transmittance of the control layer 32 must be 60% or more, and is preferably 75% or more. The thickness of the control layer 32 over the wavelength of the reproducing laser beam; is in the range of 1 nm to 10 nm, preferably, 1 nm to 5 nm.

Supposing that Tc1, Tc2, and Tc3 denotes the Curie temperatures of the control layer 32, the reproducing layer 18, and the recording layer 22, respectively, Troom denotes room temperature, and Tread denotes a surface temperature of the medium within a beam spot of a reproducing laser, it is necessary to satisfy Tc2>Tc3>Tc1>Troom and also satisfy Tread>Tc1 at an opening portion of the control layer 32. For example, the Curie temperature of the control layer 32 is about 90° C.; the Curie temperature of the reproducing layer 18 is about 300° C.; and the Curie temperature of the recording layer 22 is about 200° C.

Figure 7:
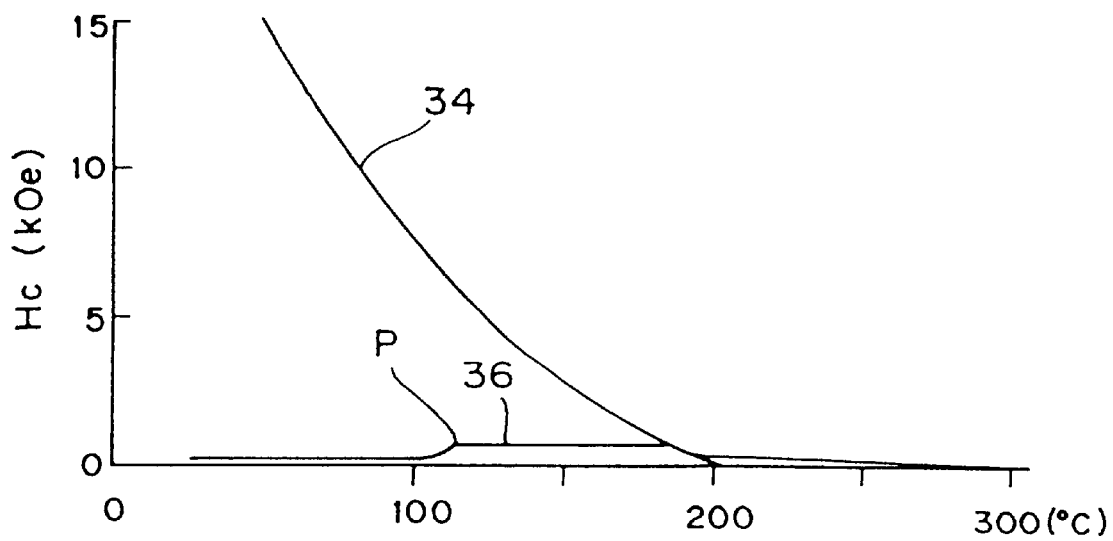
FIG. 7 is a graph showing the temperature characteristics of coercive forces of a magnetic reproducing layer and a magnetic recording layer.

Referring to FIG. 7, there is shown the coercive force-temperature characteristics of the reproducing layer 18 and the recording layer 22. The temperature characteristic of the recording layer 22 is shown by a curve 34, and the temperature characteristic of the reproducing layer 18 is shown by a curve 36. The point P on the curve 36 is a transition point where the direction of magnetization of the reproducing layer 18 changes from in-plane magnetization to perpendicular magnetization. The control layer 32 is an in-plane magnetization film, and has the Curie temperature of about 90° C. The coercive force of the control layer 32 is similar to that of the reproducing layer 18 in the range of room temperature to about 90° C.

Figure 8:
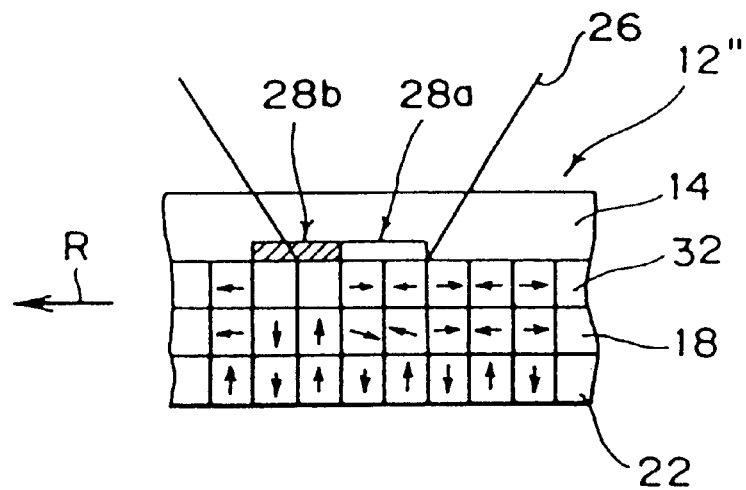
FIG. 8 is a view illustrating a reproducing method for the recording medium according to the third preferred embodiment.
Figure 9:
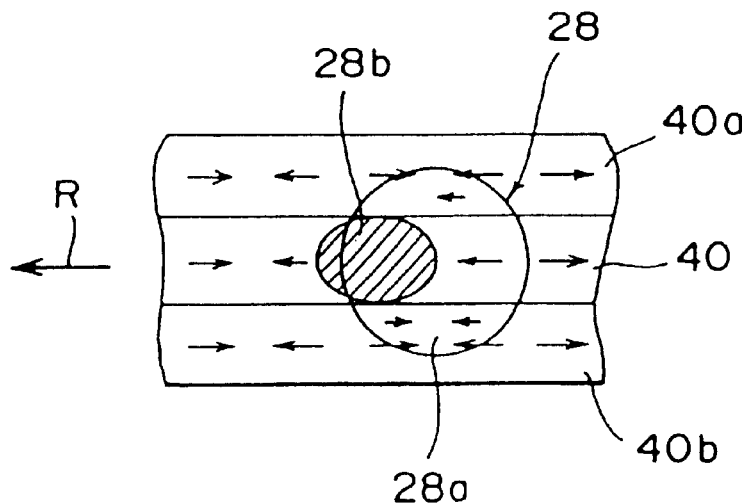
FIG. 9 is a view illustrating the relation between a reproducing laser beam irradiation area and a reproducible area.

A reproducing method for the magneto-optical recording medium 12" according to the third preferred embodiment will be described with reference to FIGS. 8 and 9. The arrows shown represent the directions of magnetization of the magnetic layers 18, 22, and 32. The medium 12" is rotated in the direction of arrow R. In FIG. 9, reference number 40 denotes a track to be reproduced, and reference numbers 40a and 40b denote tracks adjacent to the track 40.

In the high-temperature area 28b in the beam spot 28 formed on the medium 12" irradiated with the reproducing laser beam 26, the temperature of the medium becomes higher than the Curie temperature of the control layer 32, so that the magnetization of the control layer 32 disappears to form an opening at this area. In the high-temperature area 28b, the direction of magnetization of the reproducing layer 18 changes from in-plane magnetization to perpendicular magnetization, and the magnetization of the recording layer 22 is therefore transferred to the reproducing layer 18. Accordingly, a mark transferred to the reproducing layer 18 can be read through the opening of the control layer 32. In the low-temperature area 28a in the beam spot 28, if the control layer 32 is absent, the in-plane magnetization of the reproducing layer 18 is inclined to the perpendicular direction to some extent by the exchange bond to the recording layer 22.

When the control layer 32 is present, the in-plane magnetization of the control layer 32 remains because the temperature of the low-temperature area 28a is lower than the Curie temperature of the control layer 32. Accordingly, the reproducing layer 18 shows in-plane magnetization due to the exchange bond to the control layer 32, and the perpendicular component of the magnetization of the reproducing layer 18 is almost absent. Even when a fine perpendicular component of the magnetization of the layer 18 is present, it cannot be read owing to the control layer 32 functioning as a mask. In this manner, a microscopic mark can be reproduced by utilizing the presence or absence of the magnetization of the control layer 32. Further, as shown in FIG. 9, the reproduction of adjacent marks on the same track or marks recorded on the adjacent tracks 40a and 40b is avoided to thereby suppress crosstalk.

Figure 10:
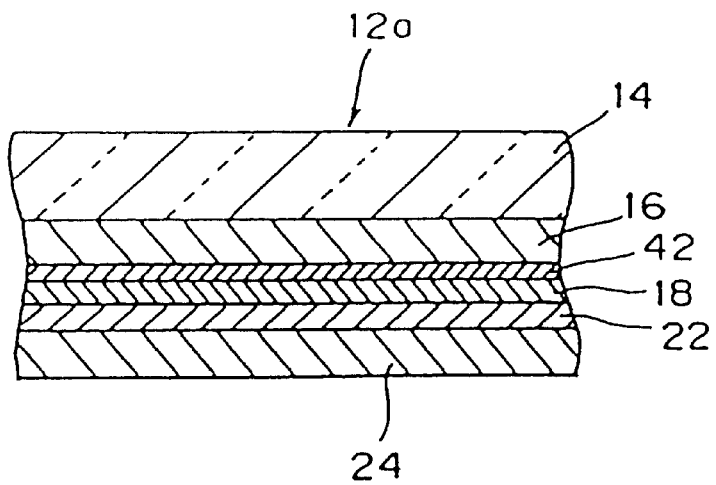
FIG. 10 is a sectional view of a magneto-optical recording medium according to a fourth preferred embodiment of the present invention.

The structure of a magneto-optical recording medium 12a according to a fourth preferred embodiment of the present invention will be described with reference to FIG. 10. In the following description of this preferred embodiment, the same parts as those in the first preferred embodiment shown in FIG. 1 are denoted by the same reference numerals, and the explanation thereof will be omitted to avoid repetition. In this preferred embodiment, a magnetic reproduction assisting layer 42 is laminated on the dielectric layer 16 by DC magnetron sputtering, for example. The magnetic reproducing layer 18 is laminated on the assisting layer 42.

The assisting layer 42 has an easy direction of magnetization perpendicular to its film surface. Letting Tc1, Tc2, and Tc3 denote the Curie temperatures of the assisting layer 42, the reproducing layer 18, and the recording layer 22, respectively, the following relations are satisfied.

Tc1>Tc3
Tc2>Tc3

Letting Hc1, Hc2, and Hc3 denote coercive forces of the assisting layer 42, the reproducing layer 18, and the recording layer 22, respectively, at room temperature, the following relations are satisfied.

Hc3>Hc1
Hc3>Hc2

The assisting layer 42, the reproducing layer 18, and the recording layer 22 are preferably formed from a rare earth-transition metal amorphous alloy film. More specifically, the assisting layer 42 and the reproducing layer 18 are preferably formed of GdFeCo alloy or GdFe alloy, and the recording layer 22 is preferably formed of TbFeCo alloy or DyFeCo alloy. Preferably, the assisting layer 42 has a thickness of 25 nm to 60 nm and a coercive force of 600 Oe or less at room temperature. Further, it is desirable that the assisting layer 42 is composed of Gd, Fe, and Co, and that the content of Gd is set in the range of 20 at % to 27 at %.

It is known that the depth of penetration of light into metal is about 25 nm. Accordingly, if the thickness of the assisting layer 42 is smaller than 25 nm, the magnetization of the reproducing layer 18 is also reproduced, causing the possibility of generation of noise. Therefore, the thickness of the assisting layer 42 must be larger than or equal to 25 nm. On the other hand, an excess thickness of the assisting layer 42 is not preferable with respect to improvement in sensitivity or the medium. The relation between the thickness of the assisting layer 42, the sensitivity of the medium, and a magneto-optical signal output was examined. As the result, it was found that the thickness of the assisting layer 42 is preferably set to 60 nm or less in order to obtain an enough magneto-optical signal output.

It is preferable that the assisting layer 42 has a coercive force of 600 Oe or less because the coercive force at room temperature must be smaller than a bias magnetic field for recording. Further, it is required that the assisting layer 42 is formed of a material showing a large Kerr rotation angle. To meet this requirement, the Curie temperature is also preferably set high. As the result of examination of the composition of the assisting layer 42, it was found that GdFeCo is preferable as mentioned above. Further, it was found that a material containing 20% to 27% of Gd and showing perpendicular magnetization is especially preferable in order to reduce the coercive force at room temperature.

Preferably, the reproducing layer 18 has a thickness of 1 nm to 40 nm, and is composed of Gd, Fe, and Co. Further, it is desirable that the content of Gd is in the range of 29% to 40%. The reproducing layer 18 is a layer for controlling the exchange bonding force between the assisting layer 42 and the recording layer 22. Since the exchange bonding force between the assisting layer 42 and the recording layer 22 must be cut off at room temperature, the thickness of the reproducing layer 18 is preferably large at room temperature. However, since the magnetization of the recording layer 22 must be transferred to the reproducing layer 18 when heated by a reproducing power, the thickness of the reproducing layer is preferably small at a raised temperature in the heated condition. That is, the thickness is preferably large at room temperature, whereas the thickness is preferably small at the raised temperature. As the result of testing to meet these requirements contrary to each other, it was found that when the thickness of the reproducing layer 18 is in the range of 1 nm to 40 nm, a high magneto-optical signal output is obtained.

As mentioned above, the preferable composition of the reproducing layer 18 is GdFeCo. In particular, it is required that the layer 18 shows in-plane magnetization at room temperature and shows the magnetic characteristic that the layer 18 is exchange-bonded to the recording layer 22 at the raised temperature. It is further required that the layer 18 has a large saturation magnetization in order to reduce the thickness of the whole magnetic film (three-layer film). As the result of testing to examine the composition that meets this requirement, it was found that the content of Gd in the reproducing layer 18 is preferably in the range of 29 at % to 40 at %.

Preferably, the recording layer 22 has a thickness of 60 nm or less, and has a Curie temperature of 250° C. or less. Since the recording layer 22 is a layer for recording information, the preferable composition of the recording layer 22 is TbFeCo or DyFeCo each having a large magnetic anisotropy as mentioned above. As the result of examination on an optimum thickness of the recording layer 22, it was found that the thickness of the recording layer 22 is made preferably less than or equal to 60 nm in order to obtain a high magneto-optical recording signal by the exchange bond between the recording layer 22 and the reproducing layer 18 at the raised temperature. Further, the Curie temperature of the recording layer 22 is made preferably less than or equal to 250° C. in order to realize a highly sensitive magneto-optical recording medium.

Figure 11:
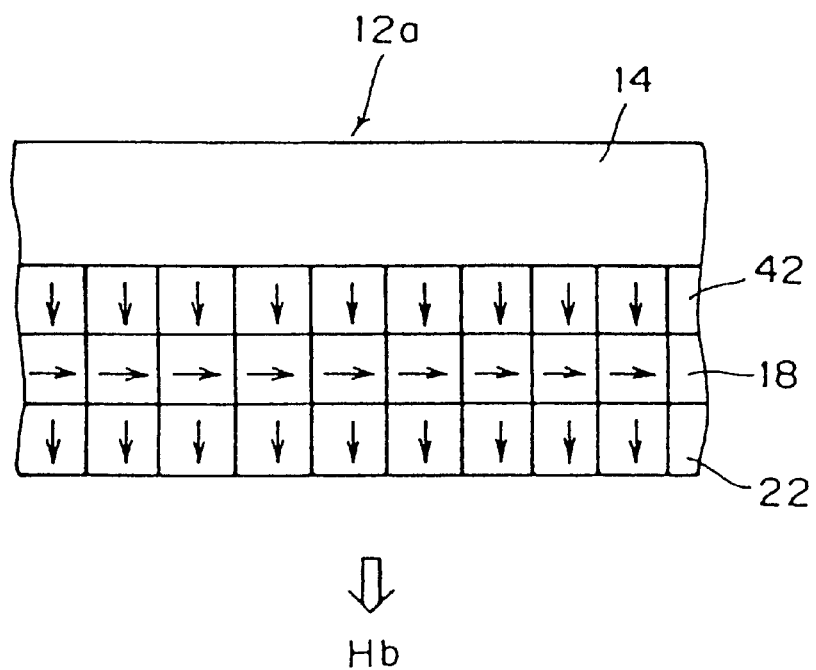
FIG. 11 is a view illustrating an erasing condition of data on the recording medium according to the fourth preferred embodiment.

An erasing method for information recorded on the recording medium 12a according to the fourth preferred embodiment will be described with reference to FIG. 11. A laser beam is directed onto the recording medium 12a to thereby heat the medium to a temperature near the Curie temperature of the recording layer 22, and a bias magnetic field is downward applied to thereby erase the information. In FIG. 11, the arrows show the direction of magnetization of each magnetic layer after erasing the information. Although the arrows in the reproducing layer 18 is are directed rightward, this means that the direction of magnetization of the reproducing layer 18 in an in-plane direction, but is not limited to a specific direction in a plane.

Figure 12:
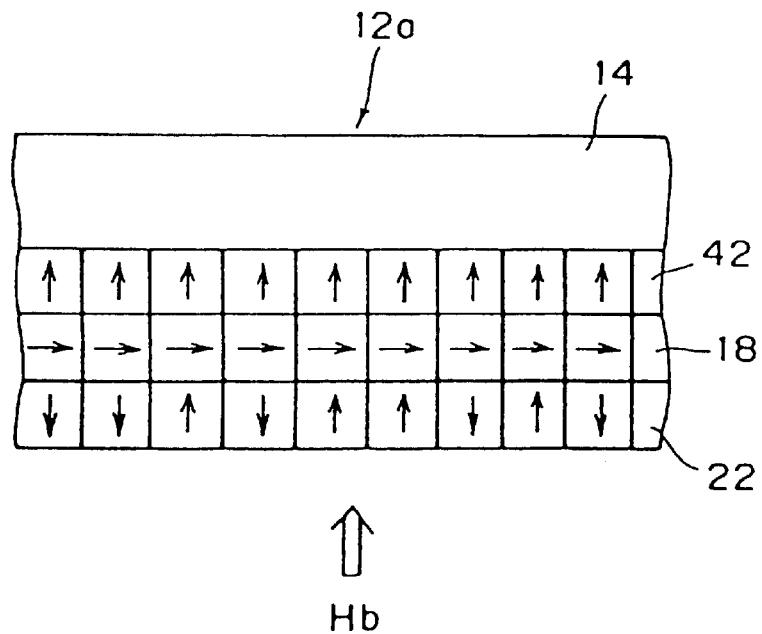
FIG. 12 is a view illustrating a recording condition of data on the recording medium according to the fourth preferred embodiment.

Referring to FIG. 12, there is shown a condition after recording information on the recording medium 12a according to the fourth preferred embodiment. In recording information, a bias magnetic field is upward applied and the medium is heated to a temperature near the Curie temperature of the recording layer 22, thereby making the direction of magnetization of the recording layer 22 upward. At this time, the directions of magnetization of the reproducing layer 18 and the assisting layer 42 are also made the same (upward) as that of the recording layer 22. When the temperature lowers, the saturation magnetization of the reproducing layer 18 increases to bring the direction of magnetization of the reproducing layer 18 into an in-plane direction. Accordingly, the magnetization of the recording layer 22 and the assisting layer 42 is upward directed in an area irradiated with a recording power. In an area where no recorded data is present (i.e., in an area where the power corresponding to a reproducing power is applied), the reproducing layer 18 is heated to temperatures higher than the temperature of exchange bond to the recording layer 22, while in a cooling stage the magnetization of the reproducing layer 18 is directed in a plane and the magnetization of the assisting layer 42 is directed upward.

Figure 13:
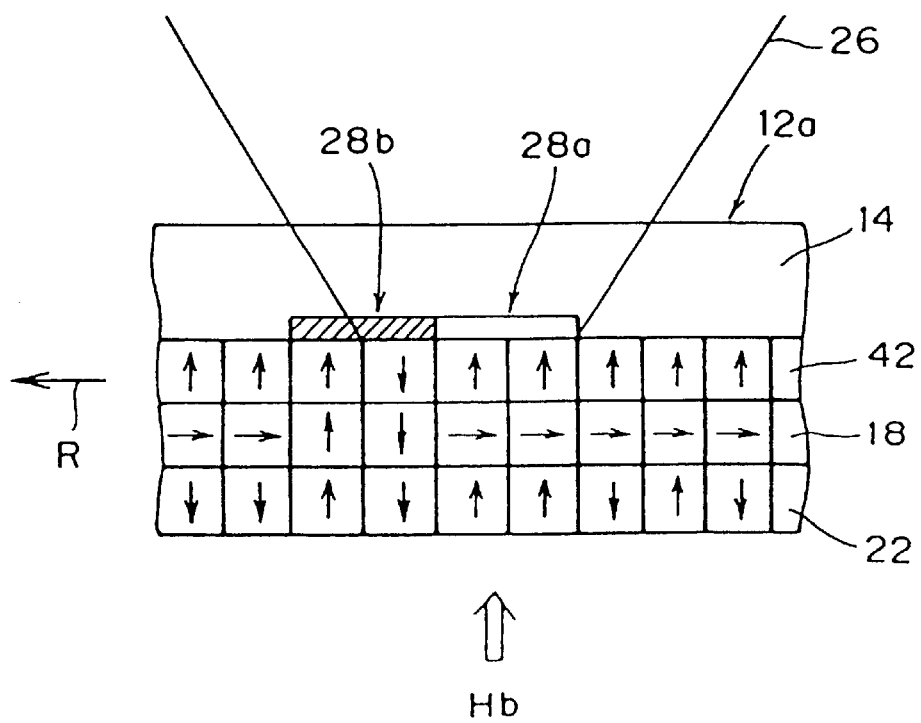
FIG. 13 is a view illustrating a reproducing method for the recording medium according to the fourth preferred embodiment.

A reproducing method for information recorded on the magneto-optical recording medium 12a according to the fourth preferred embodiment will be described with reference to FIG. 13. The magneto-optical recording medium 12a is rotated in the direction of arrow R. During reproduction of information in this preferred embodiment, a bias magnetic field having the same direction as that during recording is applied, that is, an upward bias magnetic field fib is applied. A beam spot is formed on the medium irradiated with the reproducing laser beam 26, and a temperature distribution is accordingly formed. The low-temperature area 28a in the beam spot shows a temperature lower than the temperature of exchange bond between the recording layer 22 and the reproducing layer 18, so that the magnetization of the reproducing layer 18 is directed in a plane and the magnetization of the assisting layer 42 is directed upward.

In the high-temperature area 28b in the beam spot, the recording layer 22 and the reproducing layer 18 are exchange-bonded together, and the reproducing layer 18 and the assisting layer 42 are exchange-bonded together, so that the magnetization of the recording layer 22 is transferred to the assisting layer 42. Accordingly, the information recorded in the recording layer 22 in the high-temperature area 28b is reproduced. When the high-temperature area 28b comes outside the beam spot to cause a decrease in temperature, the magnetization of the reproducing layer 18 is directed in a plane and the magnetization of the recording layer 22 keeps its recorded condition. Thus, the low-temperature area 28a and the high-temperature area 28b are formed in the beam spot by adjusting the reproducing laser power, and an opening is formed only in the high-temperature area 28b, while a mask whose magnetization is directed upward is formed, that is, an up spin mask is formed. Accordingly, a magneto-optical signal can be read from only the high-temperature area, thus allowing super resolution reproduction.

Figure 14:
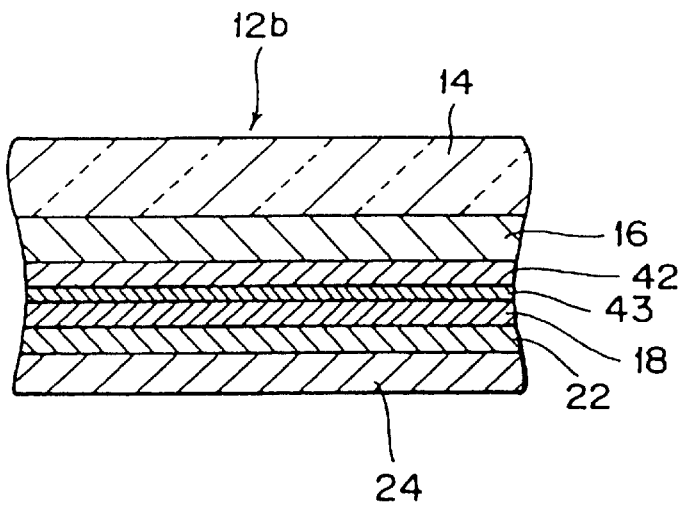
FIG. 14 is a sectional view of a magneto-optical recording medium according to a fifth preferred embodiment of the present invention.

Referring to FIG. 14, there is shown the structure of a magneto-optical recording medium 12b according to a fifth preferred embodiment of the present invention. In the following description of this preferred embodiment, the same parts as those in the fourth preferred embodiment shown in FIG. 10 are denoted by the same reference numerals, and the explanation thereof will be omitted to avoid repetition. In the magneto-optical recording medium 12a according to the fourth preferred embodiment, the assisting layer 42 and the reproducing layer 18 tend to be strongly exchange-bonded together at room temperature, and it is sometimes difficult to invert the direction of magnetization of the assisting layer 42 by a bias magnetic field.

In the fifth preferred embodiment, a nonmagnetic or paramagnetic intermediate layer 43 is interposed between the assisting layer 42 and the reproducing layer 18 in order to weaken the exchange bonding force between the assisting layer 42 and the reproducing layer 18. The insertion of the intermediate layer 43 brings about magnetically weak bond between the assisting layer 42 and the reproducing layer 18, thereby allowing easy inversion of the direction of magnetization of the assisting layer 42 by a bias magnetic field. The intermediate layer 43 is formed from Si, Al, Ti, Cu, or nitrides thereof. The thickness of the intermediate layer 43 is preferably in the range of 0.5 nm to 20 nm. The structure of the other parts are similar to that in the fourth preferred embodiment shown in FIG. 10. As an alternative feature, the nonmagnetic layer 20 of the first embodiment may be placed between the reproducing layer 18 and the recording layer 22 in addition to the intermediate layer 43 placed between the reproducing layer 18 and the assisting layer 42.

According to the fifth preferred embodiment mentioned above, the insertion of the nonmagnetic or paramagnetic intermediate layer 43 between the assisting layer 42 and the reproducing layer 18 provides a high-performance magneto-optical recording medium. However, as the compositions of the magnetic layers 42, 18, and 22 are different from each other, three kinds of sputter targets for the magnetic layers and one kind of sputter target for the intermediate layer are required, that is, four kinds of sputter targets are required. As a modification of the fifth preferred embodiment, the assisting layer 42 and the reproducing layer 18 may be formed from magnetic films having the same composition. For example, a GdFeCo amorphous alloy film having a large thickness becomes a perpendicular magnetization film because a demagnetizing field acting on the magnetic film is small, whereas the alloy film having a small thickness becomes an in-plane magnetization film at room temperature because the demagnetizing field is large.

In transferring the magnetization of the recording layer 22 to the reproducing layer 18 in the magneto-optical recording medium 12 according to the first preferred embodiment, a mask area for in-plane magnetization is narrowed more with an increase in the reproducing power, and a transfer area is therefore widened to cause the interference of the adjacent mark and reduce a reproduction output. This problem may be solved by defining a given relation in magnetic characteristic between the reproducing layer 18 and the recording layer 22 and controlling the magnitude of a bias magnetic field during reproduction. A reproducing method for information recorded on the magneto-optical recording medium 12 using such a solution for this problem will now be described.

Figure 15:
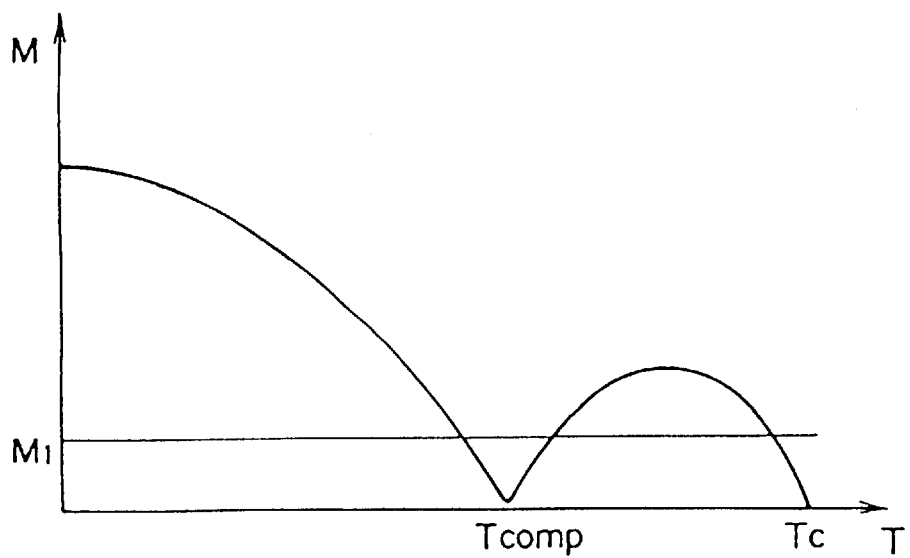
FIG. 15 is a graph showing the temperature dependency of magnetization M of a recording layer.

FIG. 15 shows the temperature dependency of magnetization M of the recording layer 22. The direction of magnetization of the reproducing layer 18 upon transition of the easy direction of magnetization from an in-plane direction to a perpendicular direction depends on a magnetostatic bonding force Hs by a magnetic field leaked from the magnetization of the recording layer 22. Let M1 denote the magnitude of magnetization of the recording layer 22 at least required for making the direction of magnetization of the reproducing layer 18 identical with that of the recording layer 22 by the magnetostatic bonding force. In a temperature area where the magnitude of magnetization of the recording layer 22 is less than M1, the direction of magnetization of the reproducing layer 18 is not identical with that of the recording layer 22.

Let Hc denote the coercive force of the reproducing layer 18 and Hs denote the magnetostatic bonding force between the recording layer 22 and the reproducing layer 18. When a bias magnetic field Hr for reproduction is applied in the above temperature area, the direction of magnetization of the reproducing layer 18 is made identical with the direction of the bias magnetic field for reproduction under the condition of Hr>He+Hs, thereby forming a mask whose magnetization direction is perpendicular. Thus, the above-mentioned problem can be solved by forming the-mask (up spin mask) whose magnetization direction is perpendicular in the beam spot.

Figure 16:
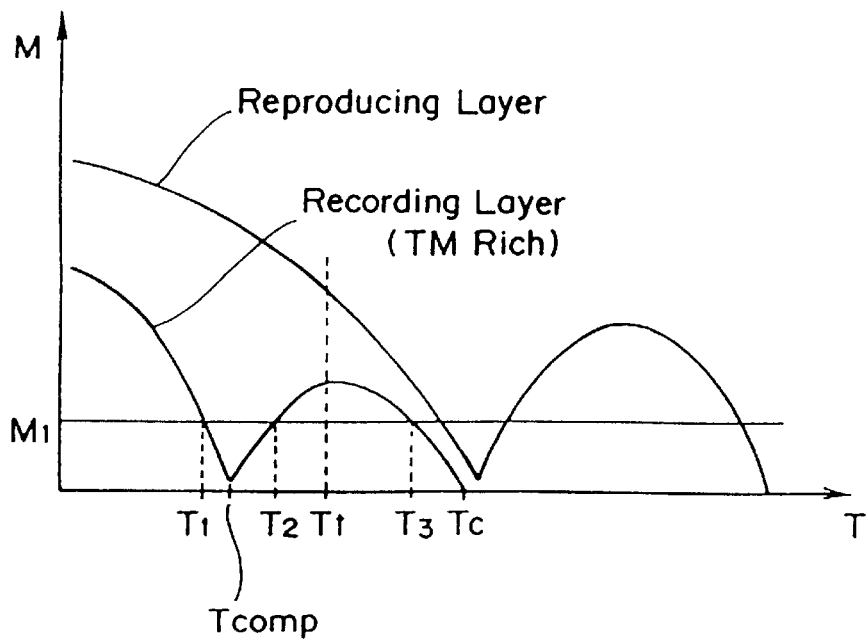
FIG. 16 is a graph showing the temperature dependencies of magnetization of a reproducing layer and a TM rich recording layer.
Figure 17A:
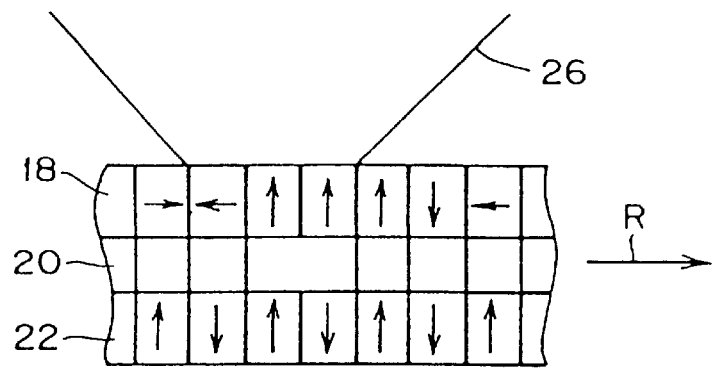
FIG. 17A is a view showing a magnetization condition of a medium having a TM rich recording layer during reproduction.
Figure 17B:
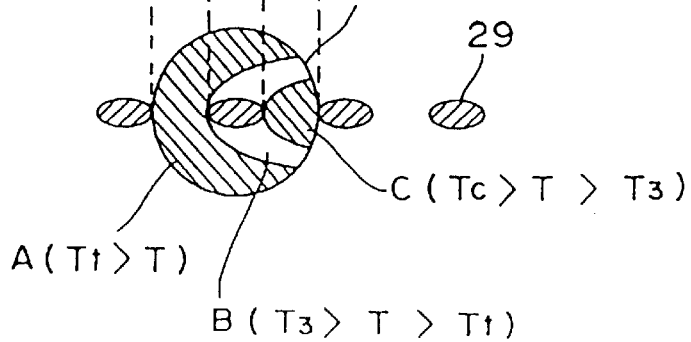
FIG. 17B is a view showing a temperature distribution in a beam spot during reproduction.

A reproducing method according to this preferred embodiment will be described in detail with reference to FIGS. 16 to 20. As described above, the reproducing layer 18 and the recording layer 22 of the magneto-optical recording medium 12 according to the first preferred embodiment are preferably formed from a rare earth-transition metal amorphous alloy film. FIG. 16 shows the temperature dependencies of magnetization of the recording layer 22 and the reproducing layer 18 in the case where the recording layer 22 is formed from a transition metal (TM) rich rare earth-transition metal amorphous alloy film. FIGS. 17A and 17B show the magnetization condition of the medium during reproduction and the temperature distribution in the beam spot, respectively.

As shown in FIG. 16, the temperature Tt at which the magnetization of the reproducing layer 18 changes from in-plane magnetization to perpendicular magnetization is set between the compensation temperature Tcomp and the Curie temperature Tc of the recording layer 22. The temperatures at which the magnetization of the recording layer 22 becomes less than M1 exist in the vicinity of the compensation temperature (T1 to T2) and in the vicinity of the Curie temperature (T3 to Tc). In FIG. 17A, the medium is rotated in the direction of arrow R. In FIG. 17B, reference numeral 28 denotes the beam spot, and reference numeral 29 denotes a mark recorded on the medium.

As shown in FIG. 17B, in a low-temperature area A in the beam spot 28, the reproducing layer 18 still shows in-plane magnetization, which masks the magnetization of the recording layer 22. In an intermediate-temperature area B in the beam spot 28, the condition of Hr<Hc+Hs is satisfied, and the magnetization of the recording layer 22 is therefore transferred to the reproducing layer 18 by the magnetostatic bonding. In a high-temperature area C in the beam spot 28, the condition of Hr>Hc+Hs is satisfied, and the direction of magnetization of the reproducing layer 18 is made identical with the direction of the bias magnetic field Hr, thus forming an up spin mask. In this manner, the in-plane magnetization mask area A is reduced with an increase in the reproducing power; however, at the same time, the up spin mask area C where the direction of magnetization is made identical with that of the bias magnetic field for reproduction is formed. Accordingly, the recorded mark transfer area B is substantially almost unchanged to avoid a reduction in the reproduction output.

Figure 18:
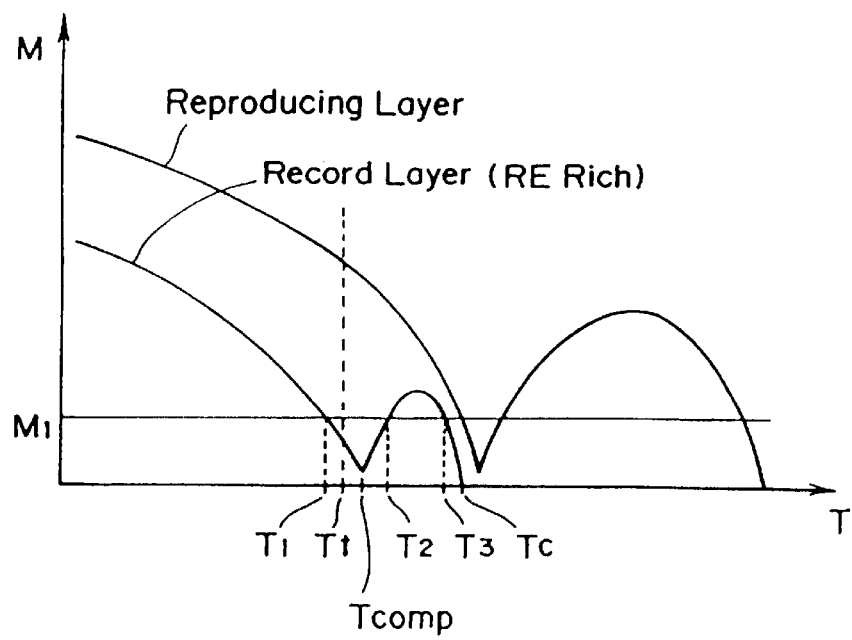
FIG. 18 is a graph showing the temperature dependencies of magnetization of a reproducing layer and an RE rich recording layer.
Figure 19A:
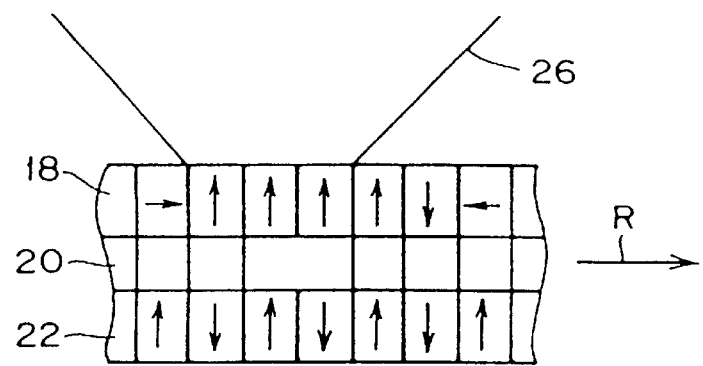
FIG. 19A is a view showing a magnetization condition of a medium having an RE rich recording layer during reproduction.
Figure 19B:
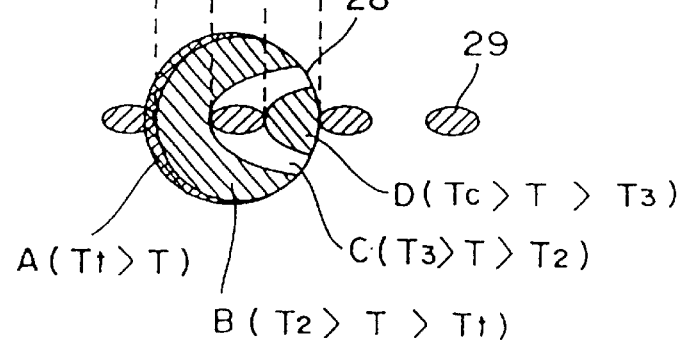
FIG. 19B is a view showing a temperature distribution in a beam spot during reproduction.
Figure 20:
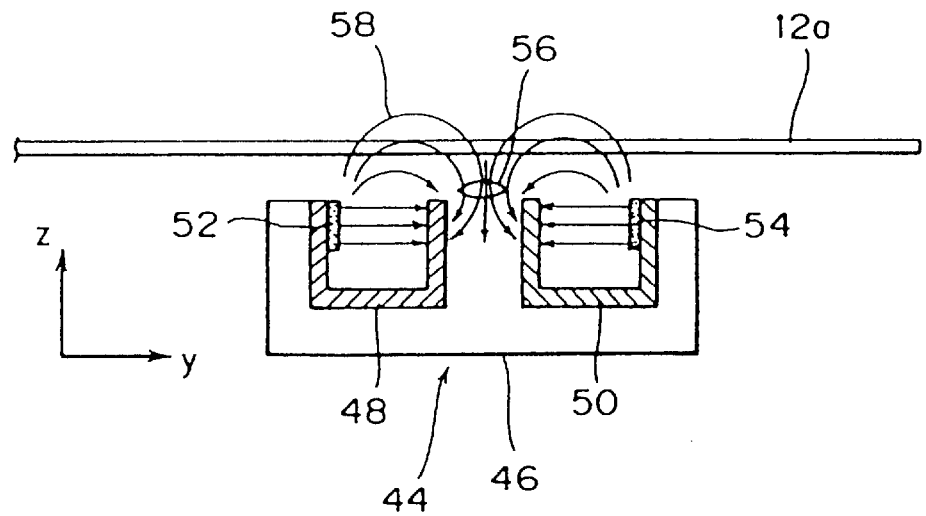
FIG. 20 is a view illustrating a leaked magnetic field in an objective lens actuator.

FIG. 18 shows the temperature dependencies of magnetization of the recording layer 22 and the reproducing layer 18 in the case where the recording layer 22 is formed from a rare earth (RE) rich rare earth-transition metal amorphous alloy film. FIG. 19A shows the magnetization condition of the medium during reproduction, and FIG. 19B shows four magnetization areas caused by the temperature distribution in the beam spot. The temperatures at which the magnetization of the recording layer 22 becomes less than M1 exist in the vicinity of the compensation temperature (T1 to T2) and in the vicinity of the Curie temperature (T3 to Tc). In this preferred embodiment, the use of the RE rich rare earth-transition metal amorphous alloy film as the recording layer 22 allows the compensation temperature Tcomp of the recording layer 22 to be increased near the Curie temperature Tc.

Accordingly, the temperature Tt at which the magnetization of the reproducing layer 18 changes from in-plane magnetization to perpendicular magnetization can be set near the compensation temperature of the recording layer 22, and two up spin masks are formed in the beam spot so that the direction of magnetization of the reproducing layer 18 is made identical with that of the bias magnetic field for reproduction (the areas B and D in FIG. 19B). That is, when Tt>T, an in-plane magnetization mask area A is formed in the beam spot, and when T2>T>Tt and Tc>T>T3, the condition of Hr>Hc+Hs is satisfied to form two up spin mask areas B and D in the beam spot so that the direction of magnetization of the reproducing layer 18 is made identical with that of the bias magnetic field for reproduction.

When T3>T>T2, the condition of Hr≦Hc+Hs is satisfied to form a recorded mark transfer area C where the magnetization of the recording layer 22 is transferred to the reproducing layer 18 by the nagnetostatic bonding. In this manner, the in-plane magnetization mask area A is greatly reduced with an increase in the reproducing power; however, at the same time, the two up spin mask areas B and D where the direction of magnetization is made identical with that of the bias magnetic field for reproduction. Accordingly, the recorded mark transfer area C is substantially almost unchanged to avoid a reduction in the reproduction output.

In the case where the coercive force Hc of the reproducing layer 18 is greatly small, a magnetic field leaked from a permanent magnet used in an objective lens actuator provided on an optical head may be used as the bias magnetic field for reproduction. This will be described with reference to FIG. 20. An objective lens actuator 44 includes two yokes 48 and 50 provided on a yoke base 46 and two permanent magnets 52 and 54 provided on the two yokes 48 and 50, respectively. The objective lens actuator 44 further includes a focusing coil (not shown) for performing the focusing of an objective lens 56 and a tracking coil (not shown) for performing the tracking. The permanent magnets 52 and 54 are located near a magneto-optical disk 12a, so that lines of magnetic force 58 leaked from the permanent magnets 52 and 54 have an influence upon the magneto-optical disk 12a. Thus, when the coercive force Hc of the reproducing layer 18 is small, the magnetic fields leaked from the permanent magnets 52 and 54 can be used as the bias magnetic field for reproduction.

EXAMPLE 1

SiN dielectric layer 16, GdFeCo reproducing layer 18, SiN intermediate layer 20, TbFeCo recording layer 22, and SiN protective layer 24 were sequentially formed on glass substrate 14 by RF sputtering. The formation of each layer by the sputtering was performed in a vacuum chamber under an ultimate vacuum of $5\times10^{-5}$ Pa or less. Specifically, the SiN layers 16, 20, and 24 were formed by the sputtering employing an Ar gas pressure of 0.2 Pa and an applied power of 0.8 kW, while the magnetic layers 18 and 22 were formed by the sputtering employing an Ar gas pressure of 0.5 Pa and an applied power of 1.0 kW.

The composition of the reproducing layer 18 is $Gd_{29}Fe_{55}Co_{16}$, and the composition of the recording layer 22 is $Tb_{20}Fe_{72}Co_{8}$. The thicknesses of the layers 16, 18, 20, 22, and 24 are 90 nm, 40 nm, 5 nm, 40 nm, and 45 nm, respectively. The Curie temperature and the compensation temperature of the reproducing layer 18 is 330° C. and 210° C., respectively, and the Curie temperature and the compensation temperature of the recording layer 22 is 220° C. and room temperature, respectively.

When only the GdFeCo reproducing layer 18 was used, the easy direction of magnetization changed from an in-plane direction to perpendicular direction at about 150° C. In the conventional structure having four layers laminated together on the substrate 14 and excluding the intermediate layer, the easy direction of magnetization of the reproducing layer 18 changed from an in-plane direction to a perpendicular direction at about 90° C. In this example having five layers laminated together on the substrate 14 and including the nonmagnetic intermediate layer 20, the easy direction of magnetization of the reproducing layer 18 changed from an in-plane direction to a perpendicular direction at about 120° C. This indicates that the exchange bonding force between the recording layer 22 arid the reproducing layer 18 was weakened.

Figure 21:
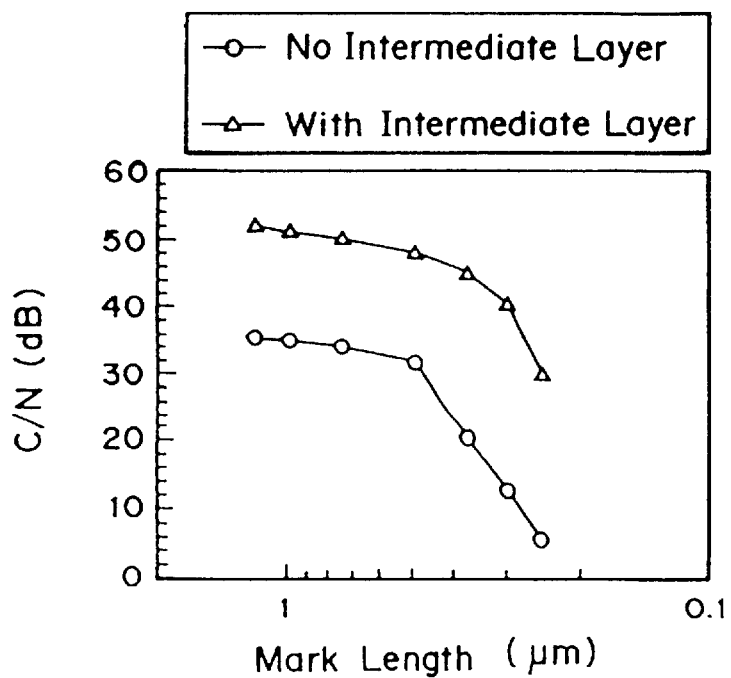
FIG. 21 is a graph showing the mark length dependency of C/N in Example 1 in comparison with the prior art.

FIG. 21 shows the mark length dependency of C/N in this example and the conventional medium having four layers excluding the intermediate layer. The conditions of measurement are a linear velocity of 3 m/s, a reproducing power of 1.2 mW, and a recording power of 2.3 to 2.5 mW. In the conventional medium having four layers excluding the intermediate layer, the C/N even for a long mark length is low. To the contrary, in the medium of this example having the nonmagnetic intermediate layer 20, it was confirmed that the C/N was largely improved.

EXAMPLE 2

SiN dielectric layer 16, GdFeCo reproducing layer 18, Al intermediate layer 20, TbFeCo recording layer 22, and SiN protective layer 24 are sequentially formed on glass substrate 14 by sputtering. The formation of each layer was performed in a vacuum chamber under an ultimate vacuum of $5 \times 10^{-5}$ Pa or less. All the layers except the intermediate layer 20 were formed under the same conditions as those in Example 1. The Al intermediate layer 20 was formed by DC sputtering employing an Ar gas pressure of 0.2 Pa and an applied power of DC 1.0 kW. The compositions of the reproducing layer 18 and the recording layer 22 are the same as those in Example 1. The thicknesses of the layers 16, 18, 20, 22, and 24 are 90 nm, 25 nm, 3 nm, 40 nm, and 45 nm, respectively.

Figure 22:
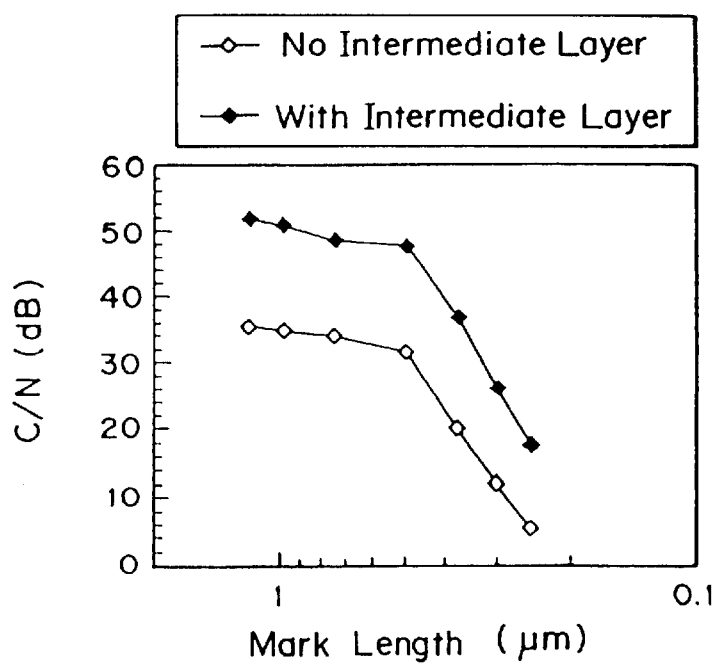
FIG. 22 is a graph showing the mark length dependency of C/N in Example 2 in comparison with the prior art.

FIG. 22 shows the mark length dependency of C/N in the conventional medium excluding the intermediate layer and in the medium of this example including the nonmagnetic metal intermediate layer. The conditions of measurement are a linear velocity of 9 m/s, a reproducing power of 2.2 mW, and a recording power of 4.8 to 5.2 mW. It was confirmed that the C/N was largely improved by interposing the nonmagnetic metal intermediate layer 20 between the reproducing layer 18 and the recording layer 22.

EXAMPLE 3

SiN dielectric layer 16, GdFeCo reproducing layer 18, NdCo intermediate layer 30, TbFeCo recording layer 22, and SiN protective layer 24 were sequentially formed on glass substrate 14 by sputtering. The formation of each layer was performed in a vacuum chamber under an ultimate vacuum of $5 \times 10^{-5}$ Pa or less. All the layers except the magnetic intermediate layer 30 were formed under the same conditions as those in Example 1. The NdCo intermediate layer 30 was formed by DC sputtering employing an Ar gas pressure of 0.2 Pa and an applied power of DC 1.0 kW.

Figure 23:
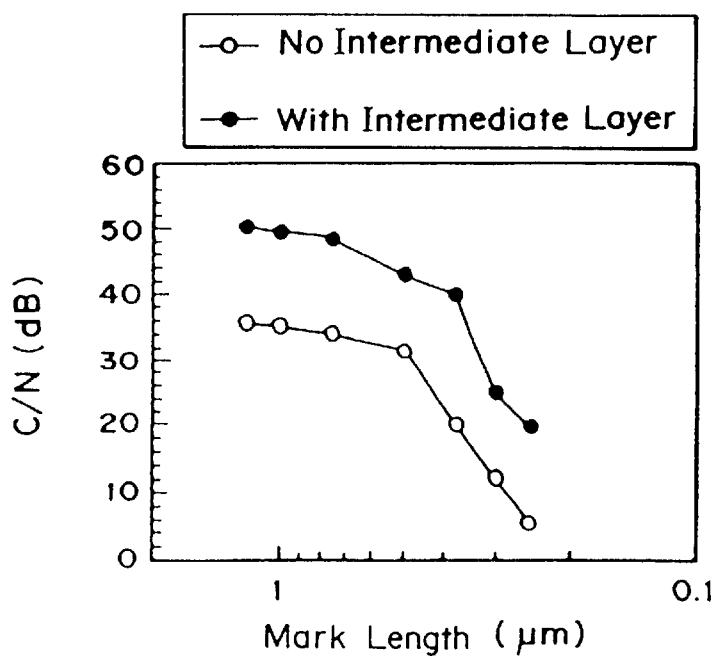
FIG. 23 is a graph showing the mark length dependency of C/N in Example 3 in comparison with the prior art.

The compositions of the reproducing layer 18 and the recording layer 22 are the same as those in Example 1. The composition of the magnetic intermediate layer 30 is $Nd_{27}Co_{73}$. The thicknesses of the layers 16, 18, 30, 22, and 24 are 90 nm, 40 nm, 10 nm, 40 nm, and 45 nm, respectively. FIG. 23 shows the mark length dependency of C/N in the conventional medium excluding the intermediate layer and in the medium of this example including the magnetic intermediate layer. The conditions of measurement are a linear velocity of 9 m/s, a reproducing power of 2.2 mW, and a recording power of 4.8 to 5.2 mW. As apparent from FIG. 23, it was confirmed that the C/N was largely improved by interposing the magnetic intermediate layer 30 between the reproducing layer 18 and the recording layer 22.

EXAMPLE 4

Tb-SiO$_2$ dielectric layer 16, DyFe control layer 32, GdFeCo reproducing layer 18, TbFeCo recording layer 22, and Tb-SiO$_2$ protective layer 24 were sequentially formed on glass substrate 14 by sputtering. The dielectric layer 16 and the protective layer 24 were formed by RF magnetron sputtering, and the control layer 32, the reproducing layer 18, and the recording layer 22 were formed by DC magnetron sputtering.

The composition of the control layer 32 is $Dy_{12}Fe_{88}$; the composition of the reproducing layer 18 is $Gd_{30}Fe_{50}Co_{20}$; and the composition of the recording layer 22 is $Tb_{20}Fe_{72}Co_8$. The thicknesses of the layers 16, 32, 18, 22, and 24 are 90 nm, 10 nm, 50 nm, 50 nm, and 90 nm, respectively. The sputtering of the dielectric layer 16 and the protective layer 24 was performed by employing an Ar gas pressure of 0.5 Pa and an applied power of RF 2 kW, and the sputtering of the control layer 32, the reproducing layer 18, and the recording layer 22 was performed by employing an Ar gas pressure of 0.5 Pa and an applied power of DC 1 kW. The Curie temperature of the control layer 32, the reproducing layer 18, and the recording layer 22 are 90° C., 300° C., and 200° C., respectively.

Figure 24A:
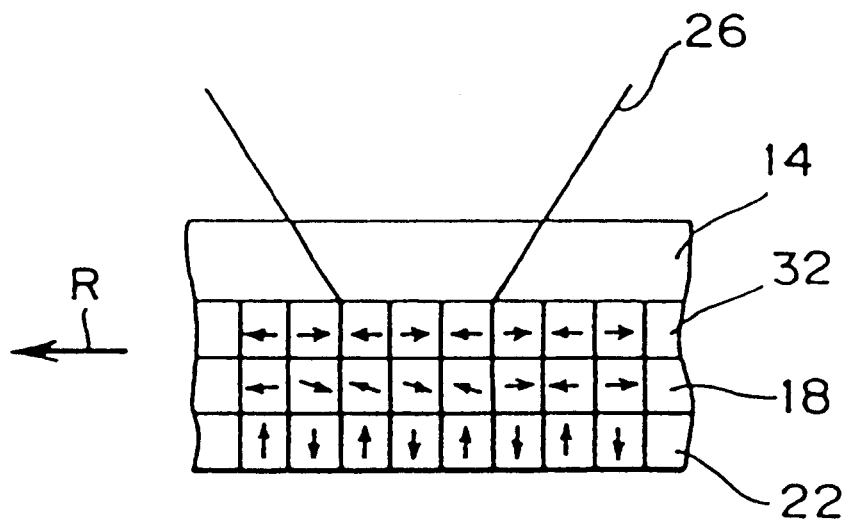
FIGS. 24A and 24B are views illustrating the relation between a reproducing power and a reproducing condition.
Figure 24B:
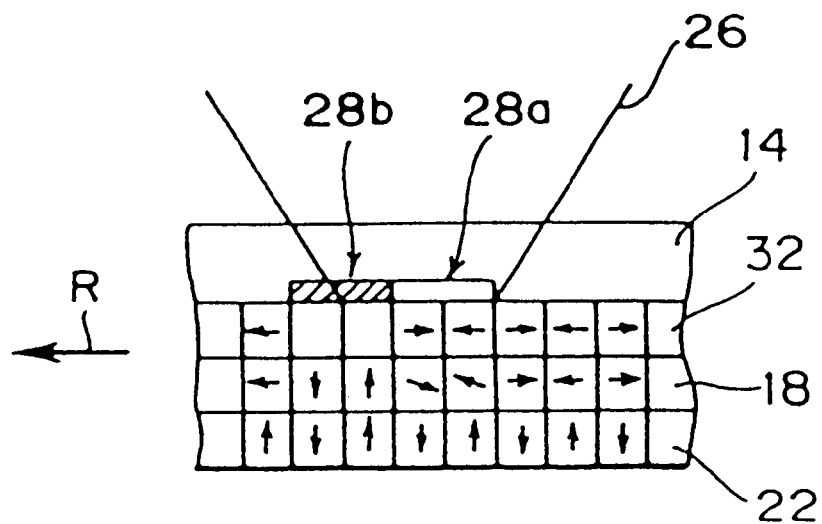

The relation between a reproducing power and a reproducing condition in this example will be described with reference to FIGS. 24A and 24B. FIG. 24A shows the reproducing condition when the reproducing power is less than 2 mW, and FIG. 24B shows the reproducing condition when the reproducing power is greater than or equal to 2 mW. In the condition of FIG. 24A where the medium is irradiated with a reproducing laser beam 26 having power less than 2 mW, the temperature of the medium does not sufficiently rise. Accordingly, the reproducing layer 18 shows in-plane magnetization, but has a perpendicular component of the magnetization to some extent due to the exchange bond to the recording layer 22. However, the control layer 32 is an in-plane magnetization film at this temperature, and the perpendicular component of the magnetization transferred to the reproducing layer 18 is therefore almost ignorably small to read.

In the condition of FIG. 24B where the medium is irradiated with a reproducing laser beam 26 having power greater than or equal to 2 mW, a low-temperature area 28a and a high-temperature area 28b are formed in a beam spot. In the high-temperature area 28b, the control layer 32 is heated to temperatures higher than the Curie temperature, and the magnetization of the control layer 32 therefore disappears to form an opening. Further, in the high-temperature area 28b, the easy direction of magnetization of the reproducing layer 18 changes from an in-plane direction to a perpendicular direction, and the magnetization of the recording layer 22 is transferred to the reproducing layer 18 by the exchange bonding force therebetween. As the thickness of the control layer 32 is 10 nm to allow a high transmittance of 60%, a mark transferred to the reproducing layer 18 can be read through the opening of the control layer 32. In the low-temperature area 28a, the temperature of the control layer 32 is lower than the Curie temperature, and the control layer 32 masks the reproducing layer 18 to prevent reproduction of any portions other than the recorded mark transferred to the reproducing layer 18.

Figure 25:
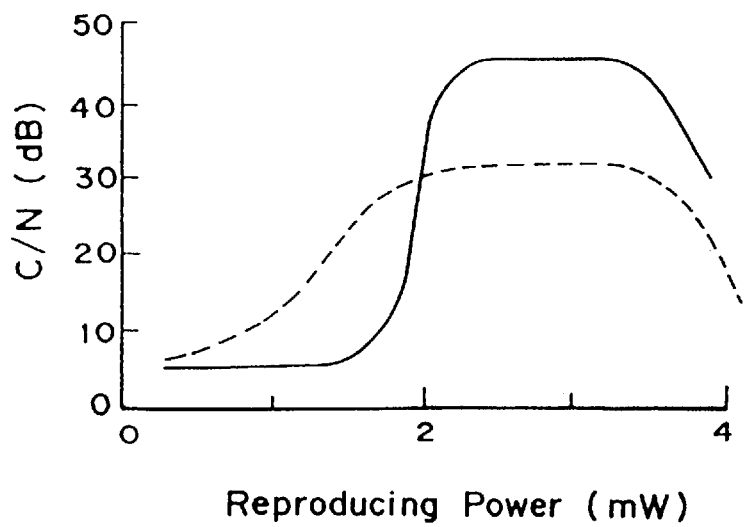
FIG. 25 is a graph showing the reproducing power dependency of C/N in Example 4 in comparison with the prior art.
Figure 26:
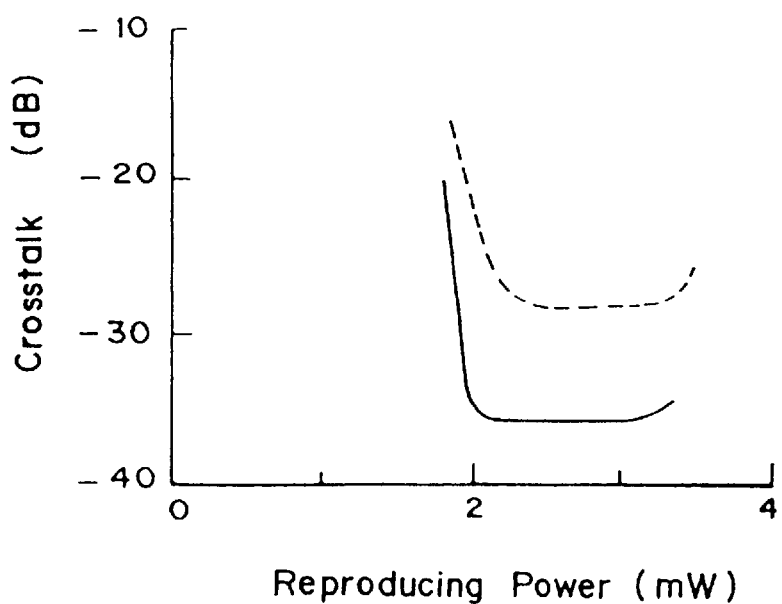
FIG. 26 is a graph showing the reproducing power dependency of crosstalk in Example 4 in comparison with the prior art.

FIG. 25 shows the reproducing power dependency of C/N in this example in comparison with the conventional medium excluding the control layer 32. This example is shown by a solid line, and the conventional medium is shown by a dashed line. As apparent from FIG. 25, the C/N in this example is remarkably improved over the C/N in the conventional medium. FIG. 26 shows the reproducing power dependency of crosstalk in this example in comparison with the conventional medium excluding the control layer. This example is shown by a solid line, and the conventional medium is shown by a dashed line. The crosstalk herein referred to is the dB value of a difference between a present signal and a previous signal. As apparent from FIG. 26, the crosstalk in this example is remarkably improved over the crosstalk in the conventional medium.

EXAMPLE 5

Tb-SiO$_2$ dielectric layer 16, DyFeCo control layer 32, GdFeCo reproducing layer 18, TbFeCo recording layer 22, and Tb-SiO$_2$ protective layer 24 were sequentially formed on glass substrate 14 by sputtering. The composition of the control layer 32 is Dy$_{35}$Fe$_{62}$Co$_3$; the composition of the reproducing layer 18 is Gd$_{30}$Fe$_{50}$Co$_{20}$; and the composition of the recording layer 22 is Tb$_{20}$Fe$_{72}$Co$_8$. The thicknesses of the layers 16, 32, 18, 22, and 24 are 90 nm, 5 nm, 70 nm, 30 nm, and 90 nm, respectively. The Curie temperature of the control layer 32 is 100° C., and the Curie temperatures of the reproducing layer 18 and the recording layer 22 are the same as those in Example 4. In this example, the thickness of the control layer 32 is smaller than that in Example 4, so that the transmittance of the control layer 32 is 85% which is higher than the transmittance in Example 4. The mechanism of magnetically induced super resolution is similar to that in Example 4.

Figure 27:
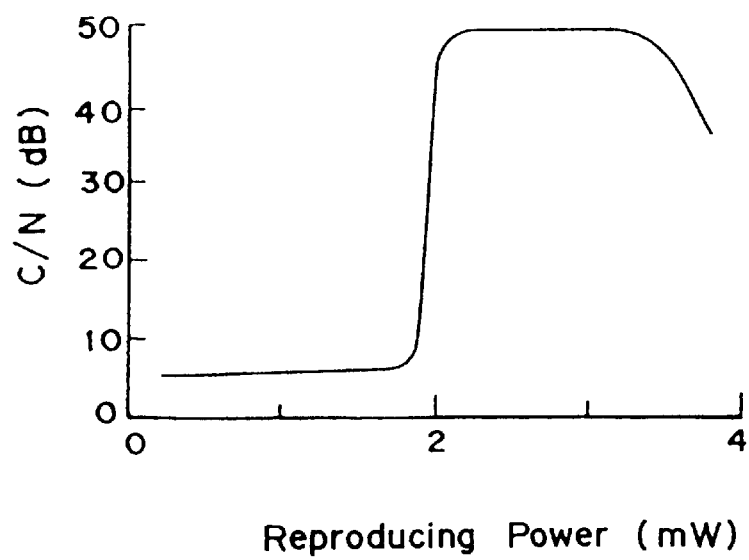
FIG. 27 is a graph showing the reproducing power dependency of C/N in Example 5.
Figure 28:
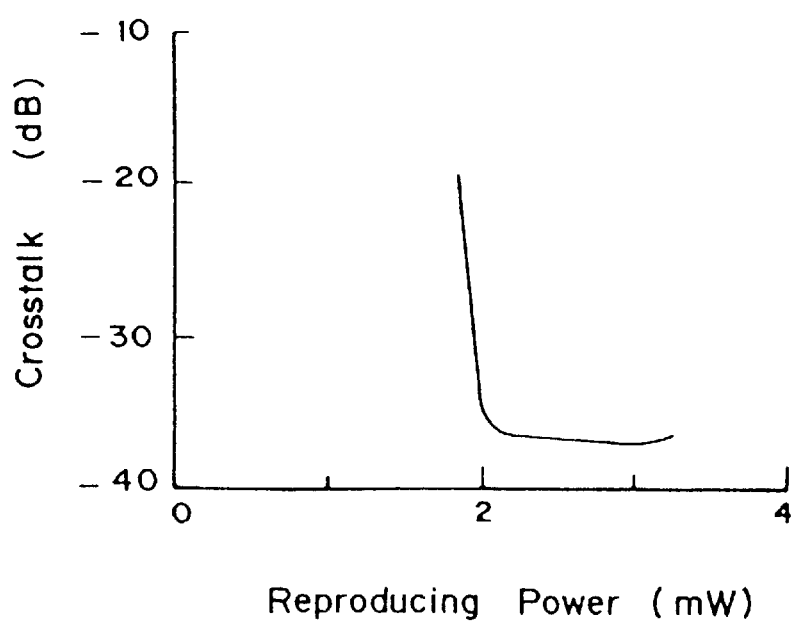
FIG. 28 is a graph showing the reproducing power dependency of crosstalk in Example 5.

FIG. 27 shows the reproducing power dependency of C/N in this example, and FIG. 28 shows the reproducing power dependency of crosstalk in this example. As apparent from FIG. 27 in comparison with FIG. 25, the C/N in this example is higher than the C/N in Example 4 because the transmittance of the control layer 32 in this (example is higher than that in Example 4. The crosstalk in this example is similar to that in Example 4.

EXAMPLE 6

Targets of TbFeCo, first GdFeCo, second GdFeCo, and Si and a polycarbonate substrate having a track pitch of 1.2 μm were set in a sputtering device, and a chamber of the sputtering device was evacuated to 10$^{-3}$ Pa. Then, SiN dielectric layer 16, GdFeCo reproduction assisting layer 42, GdFeCo reproducing layer 18, TbFeCo recording layer 22, and SiN protective layer 24 were sequentially formed on the polycarbonate substrate 14 by DC sputtering.

The SiN layers 16 and 24 were formed in the chamber under an ultimate vacuum of 5×10$^{-5}$ Pa by sputtering employing an Ar gas pressure of 0.2 Pa and an applied power of 0.8 kW, and the magnetic layers 42, 18, and 22 were formed in the chamber under the same ultimate vacuum as above by sputtering employing an Ar gas pressure of 0.5 Pa and an applied power of 1.0 kW. The composition of the assisting layer 42 is Gd$_{20}$Fe$_{54}$Co$_{26}$; the composition of the reproducing layer 18 is Gd$_{39}$Fe$_{37}$Co$_{24}$; and the composition of the recording layer 22 is Tb$_{19}$Fe$_{73}$Co$_8$. The thicknesses of the layers 16, 42, 18, 22, and 24 are 70 nm, 40 nm, 12 nm, 40 nm, and 100 nm, respectively.

As apparent from these compositions, the assisting layer 42 and the recording layer 22 are TM rich, and the reproducing layer 18 is RE rich. The Curie temperatures of the assisting layer 42, the reproducing layer 18, and the recording layer 22 are 360° C., 330° C., and 220° C., respectively. The coercive forces Hc1, Hc2, and Hc3 of the assisting layer 42, the reproducing layer 18, and the recording layer 22 at room temperature are related to satisfy Hc3>Hc1 and Hc3>Hc2.

The recording characteristic of the magneto-optical recording medium thus formed was examined. The wavelength of the laser used was 780 nm. A laser power of 9 mW was directed to the recording medium with a bias magnetic field being applied downward, thereby erasing data recorded on the recording medium. The recording of data was performed by employing a recording power of 4 mW, a frequency of 7.5 MHz, and a duty ratio of 26% as rotating the medium at a linear velocity of 3 m/sec. In recording, a bias magnetic field is applied upward. Under these conditions, a mark having a length of about 0.4 μm was recorded on the medium.

The reproducing characteristic of the recording medium was next examined. The reproduction of data was performed as upward applying a bias magnetic field. With a reproducing power of 1.5 mW, no magneto-optical signal output for a previously recorded signal was obtained. This is considered to be due to the fact that the whole area of the reproduction assisting layer 42 in the beam spot formed an up spin mask. With a reproducing power of 1.6 mW, the magnetization of the recording layer 22 was transferred through the reproducing layer 18 to the assisting layer 42 to obtain a magneto-optical signal output. This is considered to be due to the fact that an area having temperatures higher than the temperature at which the magnetization of the recording layer 22 is transferred to the reproducing layer 18 was formed to form an up spin mask and an opening. The ratio of carrier to noise (C/N) at this time was 42 dB. With a reproducing power of 1.7 mW, the direction of magnetization of the assisting layer 42 was made identical with that of the bias magnetic field, that is, the upward direction, and the diameter of an area (opening) where the reproducing layer 18 was exchange-bonded to the recording layer 22 was about 0.4 m, with the result that a C/N value of 48 dB was obtained.

EXAMPLE 7

A magneto-optical recording medium was prepared under the conditions similar to those in Example 6 with the exception that the composition and the Curie temperature of the assisting layer 42 were changed. The composition of the assisting layer 42 is Gd$_{23}$Fe$_{58}$Co$_{19}$, and the Curie temperature of the assisting layer 42 is 300° C. The recording and reproducing characteristics were measured similarly to Example 6 to obtain a C/N value of 46 dB with a reproducing power of 1.8 mW.

EXAMPLE 8

A magneto-optical recording medium was prepared by interposing an SiN film having a thickness of 5 nm between the reproducing layer 18 and the recording layer 22 of the recording medium prepared in Example 6. The recording and reproducing characteristics were measured similarly to Example 6 to obtain a C/N value of 49 dB with a reproducing power of 1.7 mW. Prior to this measurement, the thickness of the SiN film was examined to find that the thickness range of 3 nm to 10 nm is suitable for super resolution reproduction.

EXAMPLE 9

Targets of TbFeCo, first GdFeCo, second GdFeCo, and Si and a polycarbonate substrate having a track pitch of 1.2 μm were set in a sputtering device, and a chamber of the sputtering device was evacuated to $10^{-5}$ Pa. Then, an SiN film having a thickness of 70 nm was formed on the substrate by DC sputtering under the following conditions. This film serves not only to protect the magnetic film from oxidation, but also to exhibit an enhance effect such that a magneto-optical signal is enhanced.

gas pressure: 0.3 Pa sputter gas: Ar, $N_2$ pressure ratio: Ar: $N_2$=6:4 applied power: 0.8 kW

Then, the chamber was evacuated to $10^{-5}$ Pa again, and the films of the first GdFeCo, second GdFeCo, and TbFeCo were continuously formed in this order on the SiN film by DC sputtering under the following conditions.

gas pressure: 0.5 Pa sputter gas: Ar applied power: 1 kW

The composition of the assisting layer 42 is $Gd_{20}Fe_{54}Co_{26}$; the composition of the reproducing layer 18 is $Gd_{39}Fe_{37}Co_{24}$; and the composition of the recording layer 22 is $Tb_{19}Fe_{73}Co_8$. The thicknesses of the layers 42, 18, and 22 are 40 nm, 12 nm, and 50 nm, respectively.

As apparent from these compositions, the assisting layer 42 and the recording layer 22 are TM rich, and the reproducing layer 18 is RE rich. The Curie temperatures of the assisting layer 42, the reproducing layer 18, and the recording layer 22 are 360° C., 330° C., and 220° C. respectively. The coercive forces Hc1, Hc2, and Hc3 of the assisting layer 42, the reproducing layer 18, and the recording layer 22 at room temperature are related to satisfy Hc3>Hc1 and Hc3>Hc2.

The recording characteristic of the magneto-optical recording medium thus formed was examined. The wavelength of the laser used was 780 nm. A laser power of 9 mW was directed to the recording medium with a bias magnetic field being applied downward, thereby erasing data recorded on the recording medium. The recording of data was performed by employing a recording power of 4 mW, a frequency of 7.5 MHz, and a duty ratio of 26% as rotating the medium at a linear velocity of 3 m/sec. In recording, a bias magnetic field is applied upward. Under these conditions, a mark having a length of about 0.4 μm was recorded on the medium.

The reproducing characteristic of the recording medium was next examined. The reproduction of data was performed by applying a bias magnetic field upward. With a reproducing power of 1.5 mW, no magneto-optical signal output for a previously recorded signal was obtained. This is considered to be due to the fact that the whole area of the reproduction assisting layer 42 in the beam spot formed an up spin mask. With a reproducing power of 1.6 mW, the magnetization of the recording layer 22 was transferred through the reproducing layer 18 to the assisting layer 42 to obtain a magneto-optical signal output. This is considered to be due to the fact that an area having temperatures higher than the temperature at which the magnetization of the recording layer 22 is transferred to the reproducing layer 18 was formed to form an up spin mask and an opening. A C/N value at this time was 42 dB. With a reproducing power of 1.7 mW, the direction of magnetization of the assisting layer 42 was made identical with that of the bias magnetic field, that is, the upward direction, and the diameter of an area (opening) where the reproducing layer 18 was exchange-bonded to the recording layer 22 was about 0.4 μm, with the result that a C/N value of 48 dB was obtained.

Then, similar recording and reproducing characteristics were measured by employing the same conditions as those mentioned above for the reproducing layer 18 and the recording layer 22 but changing the composition of the assisting layer 42. The results of measurement are shown in Table 1. In changing the composition, the content of Gd was changed with the ratio of Fe and Co fixed.

TABLE 1

| Gd content (at %) | 19 | 20 | 21 | 23 | 24 | 26 | 27 | 28 |
|---|---|---|---|---|---|---|---|---|
| C/N (dB) | 20 | 48 | 48 | 49 | 48 | 46 | 45 | 32 |
| Coercive force (Oe) | 0 | 106 | 232 | 159 | 93 | 70 | 60 | 5 |

It is understood from Table 1 that when the content of Gd is in the range of 20 at % to 27 at %, high C/N values are obtained.

EXAMPLE 10

To examine the thickness of the assisting layer 42, a test was performed by changing the thickness of the assisting layer 42 in a recording medium similar in structure to that in Example 9. The recording and reproducing system is similar to that in Example 9. The results are shown in Table 2.

TABLE 2

| Thickness (nm) | 20 | 25 | 30 | 40 | 50 | 55 | 60 | 70 |
|---|---|---|---|---|---|---|---|---|
| C/N (dB) | 30 | 45 | 46 | 48 | 48 | 48 | 47 | 42 |

As apparent from Table 2, when the thickness is in the range of 25 nm to 60 nm, high C/N values are obtained.

EXAMPLE 11

Plural magneto-optical disks were prepared by changing the composition of the reproducing layer 18 in a magneto-optical recording medium having the same structure as that of the medium in Example 9 to examine magneto-optical signal outputs. The results are shown in Table 3. In changing the composition, the content of Gd was changed with the ratio of Fe and Co fixed. The thickness of the reproducing layer 18 is 12 nm.

TABLE 3

| Gd content (at %) | 28 | 29 | 30 | 34 | 39 | 40 | 42 |
|---|---|---|---|---|---|---|---|
| C/N (dB) | 40 | 44 | 46 | 48 | 48 | 45 | 39 |

As apparent from Table 3, it is understood that when the content of Gd is in the range of 29 at % to 40 at %, high C/N values are obtained.

EXAMPLE 12

Plural magneto-optical disks were prepared by changing the thickness of the reproducing layer 18 in a magneto-optical recording medium having the same structure as that of the medium in Example 9 to examine magneto-optical signal outputs. The results are shown in Table 4.

TABLE 4

| Thickness (nm) | 0 | 1 | 5 | 10 | 20 | 30 | 40 | 45 |
|---|---|---|---|---|---|---|---|---|
| C/N (dB) | x | 44 | 46 | 48 | 47 | 45 | 44 | 36 |

As apparent from Table 4, it was found that when the thickness of the reproducing layer 18 is in the range of 1 nm to 20 nm, high C/N values are obtained. In Table 4, the mark x indicates that magnetically induced super resolution reproduction was impossible.

EXAMPLE 13

The thickness and the Curie temperature of the recording layer 22 were examined by using a magneto-optical recording medium having the same structure as that of the medium in Example 9. When the recording layer 22 has a Curie temperature of 300° C., a recording power of about 6 mW was required in recording a mark on the medium under the same conditions as those in Example 9. Although the linear velocity of the medium was set to 3 m/sec in Example 9, an actual magneto-optical disk is rotated at a velocity three to five times greater than the above linear velocity. Accordingly, when the linear velocity is 15 m/sec, a semiconductor laser capable of outputting a recording power of about 30 mW is required. However, the maximum output of a semiconductor laser mounted on an existing magneto-optical recording device is about 12 mW. Therefore, when the Curie temperature of the recording layer 22 is 300° C., the magneto-optical recording medium cannot be put to practical use. In these circumstances, the Curie temperature of the recording layer 22 was examined to find out that the Curie temperature of about 250° C. allows a mark to be sufficiently recorded on the medium even at the linear velocity of 15 m/sec.

EXAMPLE 14

The thickness of the recording layer 22 was examined. The thicknesses of the assisting layer 42 and the reproducing layer 18 were set to 55 nm and 15 nm, respectively, and the recording layer 22 having a Curie temperature of 250° C. was adopted. When the thickness of the recording layer 22 was changed to 70 nm, a mark could not be sufficiently recorded by a laser power of 12 mW at the linear velocity of 15 m/sec. However, when the thickness of the recording layer 22 was changed to 60 nm, a mark could be sufficiently recorded even by the laser power of 12 mW. Accordingly, it was found that the thickness of the recording layer 22 is preferably 60 nm, or less.

EXAMPLE 15

The crosstalk of a magneto-optical signal was examined by using a magneto-optical recording medium having the following structure. The crosstalk herein referred to means reading of a magneto-optical signal recorded on a track adjacent to a track to be reproduced. The composition of the assisting layer 42 is $Gd_{20}Fe_{54}Co_{26}$; the composition of the reproducing layer 18 is $Gd_{39}Fe_{37}Co_{24}$; and the composition of the recording layer 22 is $Tb_{19}Fe_{73}Co_8$. The thicknesses of the layers 42, 18, and 22 are 50 nm, 15 nm, and 55 nm, respectively. The Curie temperatures of the layers 42, 18, and 22 are 360° C., 330° C., and 250° C., respectively.

The track pitch of the substrate is 1 μm; the land width of the substrate is 0.8 μm; and the groove width of the substrate is 0.2 μm. The magneto-optical recording medium having the above structure was formed on this substrate. A signal with a mark length of 0.4 μm and a mark space of 0.4 μm was recorded on the magneto-optical recording medium, and the signal recorded was reproduced by a laser having a wavelength of 780 nm. The crosstalk from the adjacent track was −−40 dB or less. Thus, it was found that the crosstalk to be solved in case of a narrow track pitch can be improved.

EXAMPLE 16

Targets of TbFeCo, first GdFeCo, second GdFeCo, and Si and a polycarbonate substrate having a track pitch of 1.2 μm were set in a sputtering device, and a chamber of the sputtering device was evacuated to $10^{-5}$ Pa. Then, an SiN film having a thickness of 70 nm was formed on the substrate by DC sputtering under the following conditions. This film serves not only to protect the magnetic film from oxidation, but also to exhibit an enhance effect such that a magneto-optical signal is enhanced.

gas pressure: 0.3 Pa
sputter gas: Ar, $N_2$
pressure ratio: Ar: $N_2$=6:4
applied power: 0.8 kW Then, the chamber was evacuated to $10^{-5}$ Pa again, and the films of the first GdFeCo, Si, second GdFeCo, and TbFeCo were continuously formed in this order on the SiN film by DC sputtering under the following conditions.

gas pressure: 0.5 Pa
sputter gas: Ar
applied power: 1 kW

The composition of the assisting layer 42 is $Gd_{20}Fe_{54}Co_{26}$; the composition of the reproducing layer 18 is $Gd_{39}Fe_{37}Co_{24}$; and the composition of the recording layer 22 is $Tb_{19}Fe_{73}Co_8$. Si intermediate layer 43 was interposed between the assisting layer 42 and the reproducing layer 18. The thicknesses of the layers 42, 43, 18, and 22 are 40 nm, 5 nm, 12 nm, and 50 nm, respectively. The Curie temperatures of the assisting layer 42, the reproducing layer 18, and the recording layer 22 are 360° C., 330° C., and 220° C., respectively. The coercive forces Hc1, Hc2, and Hc3 of the assisting layer 42, the reproducing layer 18, and the recording layer 22 at room temperature are related to satisfy Hc3>Hc1 and Hc3>Hc2.

The recording characteristic of the magneto-optical recording medium thus formed was examined. The wavelength of the laser was 780 nm. A laser power of 9 mW was directed to the recording medium with a bias magnetic field being applied downward, thereby erasing data recorded on the recording medium. The recording of data was performed by employing a recording power of 4 mW, a frequency of 7.5 MHz, and a duty ratio of 26% as rotating the medium at a linear velocity of 3 m/sec. In recording, a bias magnetic field is applied upward. Under these conditions, a mark having a length of about 0.4 μm was recorded on the medium.

The reproducing characteristic of the recording medium was next examined. The reproduction of data was performed as upward applying a bias magnetic field. With a reproducing power of 1.5 mW, no magneto-optical signal output for a previously recorded signal was obtained. This is considered to be due to the fact that the whole area of the reproduction assisting layer 42 in the beam spot formed an up spin mask. With a reproducing power of 1.6 mW, the magnetization of the recording layer 22 was transferred through the reproducing layer 18 to the assisting layer 42 to obtain a magneto-optical signal output. This is considered to be due to the fact that an area having temperatures higher than the temperature at which the magnetization of the recording layer 22 is transferred to the reproducing layer 18 was formed to form an up spin mask and an opening. A C/N value at this time was 42 dB. With a reproducing power of 1.7 mW, the direction of magnetization of the assisting layer 42 was made identical with that of the bias magnetic field, that is, the upward direction, and the diameter of an area (opening) where the reproducing layer 18 was exchange-bonded to the recording layer 22 was about 0.4 μm, with the result that a C/N value of 48 dB was obtained.

EXAMPLE 17

A magneto-optical recording medium similar to that in Example 16 was formed with the exception that the intermediate layer 43 was formed from SiN. The SiN intermediate layer 43 has a thickness of 5 nm. The reproducing characteristic of this magneto-optical recording medium was examined to find that a high signal output similar to that in Example 16 could be obtained. Further, a similar test by changing the SiN intermediate layer 43 to an Al or AlN intermediate layer was performed to find that a high signal output could similarly be obtained.

EXAMPLE 18

Plural magneto-optical recording media each having a structure similar to that in Example 16 were prepared by changing the thickness of the intermediate layer 43 to examine magneto-optical signal outputs. The results are shown in Table 5.

TABLE 5

| Thickness (nm) | 0 | 0.3 | 0.5 | 3 | 5 | 10 | 20 | 23 |
|---|---|---|---|---|---|---|---|---|
| C/N (dB) | 35 | 35 | 43 | 45 | 48 | 47 | 43 | 25 |

As apparent from Table 5, when the thickness of the intermediate layer 43 is in the range of 0.5 nm to 20 nm, high C/N values can be obtained. When the thickness of the intermediate layer 43 is excessively small, it is considered that the magnetic bond between the assisting layer 42 and the reproducing layer 18 is excessively strong to cause a reduction in C/N. When the thickness of the intermediate layer 43 is excessively large, it is considered that the magnetic bond between the assisting layer 42 and the reproducing layer 18 is excessively weak to cause a reduction in C/N.

EXAMPLE 19

The multilayer film having the structure in Example 16 was formed on a substrate having a track pitch of 1 μm. The substrate has a land width of 0.8 μm and a groove width of 0.2 μm. A signal with a mark length of 0.4 μm and a mark space of 0.4 μm was recorded on the magneto-optical recording medium obtained above, and the signal recorded was reproduced by a laser having a wavelength of 780 nm. The crosstalk from the adjacent track was −40 dB or less. Thus, it was confirmed that the crosstalk to be solved in the case of a narrow track pitch can be improved.

EXAMPLE 20

Targets of TbFeCo, GdleCo, and Si and a polycarbonate substrate having a track pitch of 1.2 μm were set in a sputtering device, and a chamber of the sputtering device was evacuated to $10^{-5}$ Pa. Then, an SiN film having a thickness of 70 nm was formed on the substrate by DC sputtering under the following conditions.

gas pressure: 0.3 Pa
    sputter gas: Ar, $N_2$
    pressure ratio: Ar: $N_2$=6:4
    applied power: 0.8 kW Then, the chamber was evacuated to $10^{-5}$ Pa again, and the films of the GdFeCo, Si, GdFeCo, and TbFeCo were continuously formed in this order on the SiN film by DC sputtering under the following conditions.

gas pressure: 0.5 Pa
    sputter gas: Ar
    applied power: 1 kW

The composition of the assisting layer 42 is $Gd_{20}Fes_{54}Co_{26}$; the composition of the reproducing layer 18 is the same as that of the assisting layer 42; and the composition of the recording layer 22 is $Tb_{19}Fe_{73}Co_8$. Si intermediate layer 43 was interposed between the assisting layer 42 and the reproducing layer 18. The thicknesses of the layers 42, 43, 18, and 22 are 40 nm, 5 nm, 12 nm, and 50 nm, respectively. The Curie temperatures of the assisting layer 42, the reproducing layer 18, and the recording layer 22 are 360° C., 360° C. and 220° C., respectively. Further, an SiN film having a thickness of 100 nm was formed on the recording layer 22 by a similar method. This SiN film serves to prevent oxidation of the magnetic film.

The recording characteristic of the magneto-optical recording medium thus formed was examined. The wavelength of laser used is 780 nm. A laser power of 9 mW was directed to the recording medium with a bias magnetic field being applied downward, thereby erasing data recorded on the recording medium. The recording of data was performed by employing a recording power of 4 mW, a frequency of 7.5 MHz, and a duty ratio of 26% as rotating the medium at a linear velocity of 3 m/sec. In recording, a bias magnetic field is applied upward. Under these conditions, a mark having a length of about 0.4 μm was recorded on the medium.

The reproducing characteristic of the recording medium was next examined. The reproduction of data was performed as upward applying a bias magnetic field. With a reproducing power of 1.5 mW, no magneto-optical signal output for a previously recorded signal was obtained. This is considered to be due to the fact that the whole area of the reproduction assisting layer 42 in the beam spot formed an up spin mask. With a reproducing power of 1.6 mW, the magnetization of the recording layer 22 was transferred through the reproducing layer 18 to the assisting layer 42 to obtain a magneto-optical signal output. This is considered to be due to the fact that an area having temperatures higher than the temperature at which the magnetization of the recording layer 22 is transferred to the reproducing layer 18 was formed to form an up spin mask and an opening. A C/N value at this time was 42 dB. With a reproducing power of 1.7 mW, the direction of magnetization of the assisting layer 42 was made identical with that of the bias magnetic field, that is, the upward direction, and the diameter of an area (opening) where the reproducing layer 18 was exchange-bonded to the recording layer 22 was about 0.4 μm, with the result that a C/N value of 48 dB was obtained.

EXAMPLE 21

A magneto-optical recording medium similar to that in Example 20 was formed with the exception that the intermediate layer 43 was formed from SiN. A test similar to that in Example 20 was performed to find that a high signal output similar to that in Example 20 could be obtained. Further, a similar test by changing the SiN intermediate layer 43 to an Al or AlN intermediate layer was performed to find that a high signal output could similarly be obtained.

EXAMPLE 22

Targets of TbFeCo, GdFeCo, and Si and a polycarbonate substrate having a track pitch of 1.2 μm were set in a sputtering device, and a chamber of the sputtering device was evacuated to $10^{-5}$ Pa. Then, an SiN film having a thickness of 70 nm was formed on the substrate by DC sputtering under the following conditions.

gas pressure: 0.3 Pa sputter gas: Ar, $N_2$ pressure ratio: Ar: $N_{2=6:4}$ applied power: 0.8 kW Then, the chamber was evacuated to $10^{-5}$ Pa again, and the films of the GdFeCo, Si, GdFeCo, and TbFeCo were continuously formed in this order on the SiN film by DC sputtering under the following conditions.

gas pressure: 0.5 Pa sputter gas: Ar applied power: 1 kW

The composition of the assisting layer 42 is $Gd_{23}Fe_{51}Co_{26}$; the composition of the reproducing layer 18 is the same as that of the assisting layer 42; and the composition of the recording layer 22 is $Tb_{19}Fe_{73}Co_8$. Si intermediate layer 43 was interposed between the assisting layer 42 and the reproducing layer 18. The thicknesses of the layers 42, 43, 18, and 22 are 30 nm, 5 nm, 10 nm, and 50 nm, respectively. The Curie temperatures of the assisting layer 42, the reproducing layer 18, and the recording layer 22 are 360° C., 360° C., and 220° C., respectively. Further, an SiN film having a thickness of 100 nm was formed on the recording layer 22 by a similar method. The recording and reproducing characteristics of this magneto-optical recording medium were examined. Measurement similar to that in Example 20 was made to find that a C/N value of 48 dB was obtained by a reproducing power of 2 mW.

EXAMPLE 23

The common composition of the assisting layer 42 and the reproducing layer 18 was replaced by a TbFeCo or DyFeCo amorphous alloy to perform a test similar to that in Example 20. As the result, even when the thickness was small, an in-plane magnetization film could not be realized. Accordingly, it was found that the optimum common composition of the assisting layer 42 and the reproducing layer 18 is GdFeCo.

EXAMPLE 24

The multilayer film having the structure in Example 20 was formed on a substrate having a track pitch of 1 μm. The substrate has a land width of 0:8 μm and a groove width of 0.2 μm. A signal with a mark length of 0.4 μm and a mark space of 0.4 μm was recorded on the magneto-optical recording medium obtained above, and the signal recorded was reproduced by a laser having a wavelength of 780 nm. The crosstalk from the adjacent track was. −40 dB or less. Thus, it was confirmed that the crosstalk to be solved in case of a narrow track pitch can be improved.

EXAMPLE 25

SiN dielectric layer 16, GdFeCo reproducing layer 18, SiN intermediate layer 20, TbFeCo recording layer 22, and SiN protective layer 24 were sequentially formed on glass substrate 14 by RF sputtering. The formation of each layer by the sputtering was performed in a vacuum chamber under an ultimate vacuum of $5 \times 10^{-5}$ Pa or less. Specifically, the SiN layers 16, 20, and 24 were formed by the sputtering employing an Ar gas pressure of 0.2 Pa and an applied power of 0.8 kW, while the magnetic layers 18 and 22 were formed by the sputtering employing an Ar gas pressure of 0.5 Pa and an applied power of 1.0 kW.

The composition of the reproducing layer 18 is $Gd_{29}Fe_{55}Co_{16}$, and the composition of the recording layer 22 is $Tb_{18}Fe_{68}Co_{14}$,. The thicknesses of the layers 16, 18, 20, 22, and 24 are 90 nm, 40 nm, 5 nm, 40 nm, and 45 nm, respectively. The Curie temperature and the compensation temperature of the reproducing layer 18 is 330° C. and 220° C., respectively, and the Curie temperature and the compensation temperature of the recording layer 22 is 260° C. and 80° C., respectively.

Figure 29:
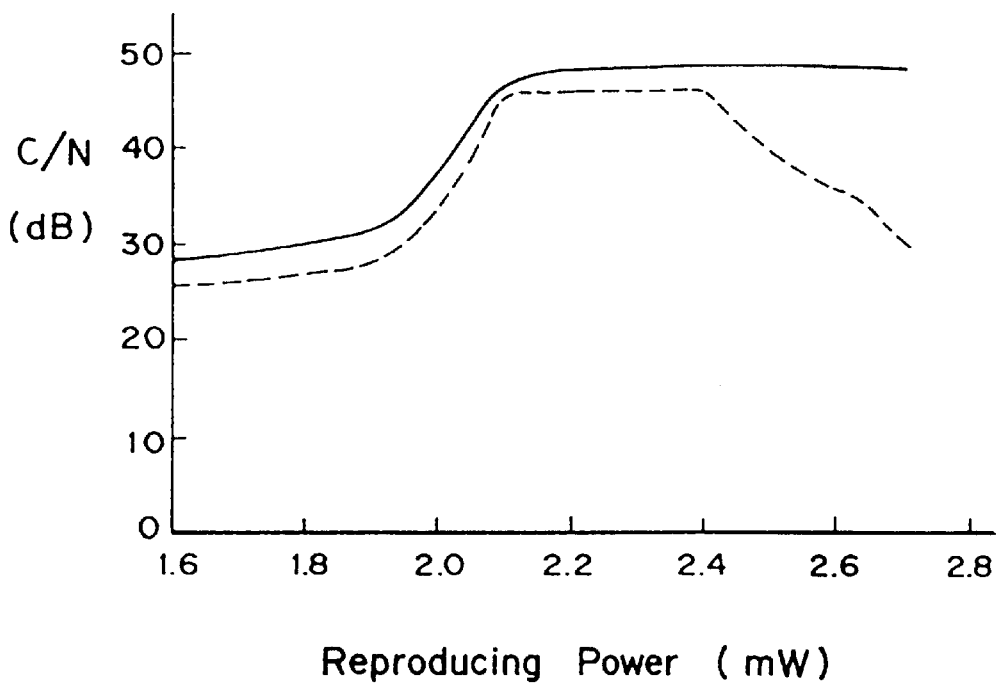
FIG. 29 is a graph showing the reproducing power dependency of C/N in Example 9 in comparison with Example 1.

A bit having a mark length of 0.4 μm was recorded on the magneto-optical recording medium prepared above, and the reproducing power dependency of C/N was measured. The result of measurement is shown by a solid line in FIG. 29. A broken line in FIG. 29 shows the reproducing power dependency of C/N in the recording medium prepared in Example 1. The recording and reproducing conditions are a linear velocity of 5 m/sec, a recording power of 5.4 mW, and a duty ratio of 25%. A magnetic field (about 40 Oe) leaked from an objective lens actuator was used for the bias magnetic field for reproduction. It was confirmed that even when the reproducing power was increased, the reproduction output was not decreased in the recording medium prepared in this example as compared with the recording medium prepared in Example 1.

EXAMPLE 26

SiN dielectric layer 16, GdFeCo reproducing layer 18, SiN intermediate layer 20, TbFeCo recording layer 22, and SiN protective layer 24 were sequentially formed on glass substrate 14 by RF sputtering. The composition of the recording layer 22 is $Tb_{26}Fe_{61}Co_{13}$, and the composition of the reproducing layer 18 is the same as that in Example 25. The Curie temperature and the compensation temperature of the recording layer 22 are 220° C. and 140° C., respectively. The thicknesses of the layers 16, 18, 20, 22, and 24 are 90 nm, 40 nm, 5 nm, 40 nm, and 45 nm, respectively.

Figure 30:
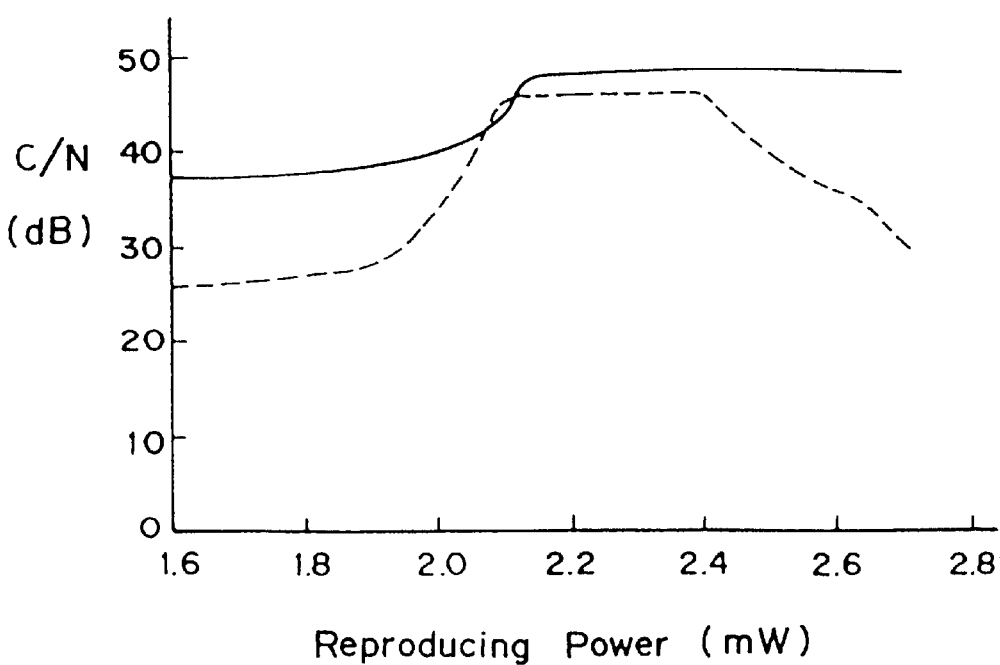
FIG. 30 is a graph showing the reproducing power dependency of C/N in Example 10 in comparison with Example 1.

A bit having a mark length of 0.4 μm was recorded on the magneto-optical recording medium prepared above, and the reproducing power dependency of C/N was measured. The result of measurement is shown by a solid line in FIG. 30. A broken line in FIG. 30 shows the reproducing power dependency of C/N in the recording medium prepared in Example 1. The recording and reproducing conditions are a linear velocity of 5 m/sec, a recording power of 5.4 mW, and a duty ratio of 25%. A magnetic field (about 40 Oe) leaked from an objective lens actuator was used for the bias magnetic field for reproduction. It was confirmed that even when the reproducing power was increased, the reproduction output was not decreased in the recording medium prepared in this example employing the RE rich rare earth-transition metal amorphous alloy film for the recording layer 22.

The present invention as described above has an effect that a reproduction output can be improved by perfectly masking a mark adjacent to a mark to be reproduced. In addition, the crosstalk can also be improved.

What is claimed is:

1. A reproducing method for information recorded on a magneto-optical recording medium comprising:

a magnetic reproducing layer having an easy direction of magnetization in a plane at room temperature and having an easy direction of magnetization perpendicular to a plane defined by said reproducing layer at a temperature Ts or higher, said temperature Ts being defined as a temperature at which said direction of magnetization of said magnetic reproducing layer changes from an in-plane direction to a perpendicular direction;

a nonmagnetic intermediate layer laminated on said reproducing layer; and a magnetic recording layer laminated on said nonmagnetic intermediate layer, said recording layer having an easy direction of magnetization perpendicular to a plane defined by said recording layer;

wherein said nonmagnetic intermediate layer is configured to allow a magnetostatic bond between said recording layer and said reproducing layer;

said reproducing method comprising the steps of:

directing a laser beam onto said recording medium while applying a bias magnetic field to heat said recording medium to temperatures lower than a Curie temperature of said recording layer; and forming a temperature distribution in a beam spot, said temperature distribution comprising a first temperature area where the direction of magnetization of said reproducing layer is an in-plane direction, a second temperature area where Hr<Hs+Hc is satisfied and magnetization of said recording layer is transferred to said reproducing layer by magnetostatic bond, and a third temperature area where Hr>Hs+Hc is satisfied and the direction of magnetization of said reproducing layer is identical with the direction of said bias magnetic field;

where Hr represents a strength of said bias magnetic field, Hs represents a magnetostatic bonding force between said reproducing layer and said recording layer, and Hc represents a coercive force of said reproducing layer.

2. A reproducing method according to claim 1, wherein said recording layer is formed from a transition metal rich rare earth-transition metal amorphous alloy film.

3. A reproducing method according to claim 1, wherein a magnetic field leaked from a permanent magnet of an objective lens actuator provided on an optical head is used as said bias magnetic field, for reproduction.

4. A reproducing method for information recorded on a magneto-optical recording medium comprising:

a magnetic reproducing layer having an easy direction of magnetization in a plane at room temperature and having an easy direction of magnetization perpendicular to a plane defined by said reproducing layer at a temperature Ts or higher, said temperature Ts being defined as a temperature at which said direction of magnetization of said magnetic reproducing layer changes from an in-plane direction to a perpendicular direction;

a nonmagnetic intermediate layer laminated on said reproducing layer; and a magnetic recording layer laminated on said nonmagnetic intermediate layer, said recording layer having an easy direction of magnetization perpendicular to a plane defined by said recording layer;

wherein said nonmagnetic intermediate layer is configured to allow a magnetostatic bond between said recording layer and said reproducing layer;

said reproducing method comprising the steps of:

directing a laser beam onto said recording medium to heat said recording medium to temperatures lower than a Curie temperature of said recording layer; and forming a temperature distribution in a beam spot, said temperature distribution comprising a first temperature area where the direction of magnetization of said reproducing layer is an in-plane direction, an second temperature area where Hr≦Hs+Hc is satisfied and magnetization of said recording layer is transferred to said reproducing layer by said magnetostatic bond, and a third temperature area where Hr>Hs+Hc is satisfied and the direction of magnetization of said reproducing layer is identical with a direction of a magnetic field leaked from a permanent magnet provided in an optical head of a magneto-optical disk drive;

where Hr represents a strength of said magnetic field leaked from said permanent magnet, Hs represents a magnetostatic bonding force between said reproducing layer and said recording layer, and Hc represents a coercive force of said reproducing layer.

5. A reproducing method for information recorded on a magneto-optical recording medium comprising:

a magnetic reproducing layer having an easy direction of magnetization in a plane at room temperature and having an easy direction of magnetization perpendicular to a plane defined by said reproducing layer at a temperature Ts or higher, said temperature Ts being defined as a temperature at which said direction of magnetization of said magnetic reproducing layer changes from an in-plane direction to a perpendicular direction;

a nonmagnetic intermediate layer laminated on said reproducing layer; and a magnetic recording layer laminated on said nonmagnetic intermediate layer, said recording layer having an easy direction of magnetization perpendicular to a plane defined by said recording layer;

wherein said nonmagnetic intermediate layer is configured to allow a magnetostatic bond between said recording layer and said reproducing layer;

said reproducing method comprising the steps of:

directing a laser beam onto said recording medium while applying a bias magnetic field to heat said recording medium to temperatures lower than a Curie temperature of said recording layer; and forming a temperature distribution in a beam spot, said temperature distribution comprising a first temperature area where Hr>Hs+Hc is satisfied and the direction of magnetization of said reproducing layer is identical with the direction of said bias magnetic field, an second temperature area where Hr≦Hs+Hc is satisfied and magnetization of said recording layer is transferred to said reproducing layer by magnetostatic bond, and a third temperature area where Hr>Hs+Hc is satisfied and the direction of magnetization of said reproducing layer is identical with the direction of said bias magnetic field;

where Hr represents a strength of said bias magnetic field, Hs represents a magnetostatic bonding force between said reproducing layer and said recording layer, and Hc represents a coercive force of said reproducing layer.

6. A reproducing method according to claim 5, wherein said recording layer is formed from a rare earth rich rare earth-transition metal amorphous alloy film.

7. A reproducing method according to claim 5, wherein a magnetic field leaked from a permanent magnet of an objective lens actuator provided on an optical head is used as said bias magnetic field for reproduction.

8. A reproducing method for information recorded on a magneto-optical recording medium comprising:
- a magnetic reproduction assisting layer having an easy direction of magnetization perpendicular to a plane defined by said assisting layer;
- a magnetic reproducing layer laminated on said assisting layer, said reproducing layer having an easy direction of magnetization in a plane defined by said reproducing layer at room temperature and being composed of Gd, Fe, and Co, a content of Gd being set in a range of 29 at % to 40 at %; and
- a magnetic recording layer laminated on said reproducing layer, said recording layer having an easy direction of magnetization perpendicular to a plane defined by said recording layer,
- wherein a Curie temperature Tc1 of said assisting layer, a Curie temperature Tc2 of said reproducing layer, and a Curie temperature Tc3 of said recording layer are related to satisfy Tc3<Tc1 and Tc3<Tc2; and
- a coercive force Hc1 of said assisting layer and a coercive force Hc3 of said recording layer are related to satisfy Hc3>Hc1;
- said reproducing method comprising the steps of:
  - directing a laser beam onto said recording medium while applying a bias magnetic field to heat said recording medium to temperatures lower than said Curie temperature Tc3 of said recording layer; and
  - forming a temperature distribution in a beam spot, said temperature distribution comprising a first temperature area where the direction of magnetization of said assisting layer is identical with the direction of said bias magnetic field, and a second temperature area where said magnetization of said recording layer is transferred to said assisting layer by exchange bond.

9. A reproducing method for information recorded on a magneto-optical recording medium comprising:
- a magnetic reproducing layer having an easy direction of magnetization in a plane defined by said reproducing layer at a room temperature and having an easy direction of magnetization perpendicular to said plane at or above a first elevated temperature which is below a Curie temperature of said reproducing layer;
- a magnetic intermediate layer laminated on said reproducing layer, said magnetic intermediate layer having an easy direction of magnetization in a plane defined by said intermediate layer below a Curie temperature Tc of said intermediate layer, said magnetic intermediate layer being formed from a light rare earth-transition metal amorphous alloy film represented by $R_x Fe_y Co_{1-x-y}$ where R is selected from the group consisting of Nd and Sm, where $0<x<0.5$ and $0<y<0.5$; and
- a magnetic recording layer laminated on said magnetic intermediate layer, said recording layer having an easy direction of magnetization perpendicular to a plane defined by said recording layer and having a Curie temperature higher than 200° C.;
- wherein said Curie temperature Tc of said magnetic intermediate layer and a temperature Tread of at least a portion of said reproducing layer within a beam spot of a reproducing laser are related to satisfy Tread<Tc;
- said reproducing method comprising the steps of:
  - directing a laser beam onto said recording medium to heat said recording medium to temperatures lower than the Curie temperature of said recording layer; and
  - forming a temperature distribution in a beam spot of said laser beam, said temperature distribution comprising a low-temperature area where the direction of magnetization of said reproducing layer is an in-plane direction, and a high-temperature area where said magnetic intermediate layer is magnetized in a direction perpendicular to said recording layer, said low-temperature area having a temperature below said first elevated temperature, said high-temperature area having a temperature at or above said first elevated temperature, and said reproducing layer and said recording layer are exchange-bonded together through said magnetic intermediate layer.

* * * * *

UNITED STATES PATENT AND TRADEMARK OFFICE
CERTIFICATE OF CORRECTION

PATENT NO.   : 6,356,516 B2
DATED        : March 12, 2002
INVENTOR(S)  : Tamanoi et al.

It is certified that error appears in the above-identified patent and that said Letters Patent is hereby corrected as shown below:

Column 34,
Line 15, delete "$0<y<0.5$" and insert -- $0 \leq y \leq 0.5$ -- therefore.

Signed and Sealed this

Nineteenth Day of November, 2002

Attest:

JAMES E. ROGAN
Attesting Officer        Director of the United States Patent and Trademark Office